United States Patent
Yoganandan et al.

(10) Patent No.: US 10,969,899 B2
(45) Date of Patent: Apr. 6, 2021

(54) DYNAMICALLY ADAPTIVE SENSING FOR REMOTE HOVER TOUCH

(71) Applicant: Samsung Electronics Co., Ltd., Suwon-si (KR)

(72) Inventors: Arun Rakesh Yoganandan, San Francisco, CA (US); Chang Long Zhu Jin, San Mateo, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/517,339

(22) Filed: Jul. 19, 2019

(65) Prior Publication Data
US 2021/0019010 A1    Jan. 21, 2021

(51) Int. Cl.
    *G06F 3/041*    (2006.01)
(52) U.S. Cl.
    CPC .. *G06F 3/0416* (2013.01); *G06F 2203/04101* (2013.01)
(58) Field of Classification Search
    CPC ............. G06F 3/0416; G06F 2203/04101
    USPC ...................................... 345/173
    See application file for complete search history.

(56) References Cited

U.S. PATENT DOCUMENTS

| 9,213,482 B2 | 12/2015 | Mai et al. |
| 9,781,468 B2 | 10/2017 | Kirby |
| 2004/0041723 A1 | 3/2004 | Shibamiya et al. |
| 2012/0044164 A1 | 2/2012 | Kim et al. |
| 2017/0364198 A1* | 12/2017 | Yoganandan ......... G06F 1/1626 |

FOREIGN PATENT DOCUMENTS

| EP | 2597548 A2 | 5/2013 |
| KR | 1151300 B1 | 6/2012 |

* cited by examiner

*Primary Examiner* — Deeprose Subedi

(57) ABSTRACT

A hover touch controller device includes a touch sensor having a touch surface with a first aspect ratio and a proximity sensor. Information on when and where a user touches the touch surface is detected. Additionally, information on hover-input events is detected. The hover input events correspond to a user's finger hovering over the touch surface within some maximum depth. The hover touch device further includes a controller. The processor communicates three-dimensional spatial information to a Graphical User Interface (GUI). The GUI generates visualizations based on the hover events and the touch events on a display having an interactive surface with a second aspect ratio. The processor further corrects for any issues associated with supporting a variety of GUI designs. This can include correcting for a difference between the first aspect ratio and the second aspect ratio.

21 Claims, 15 Drawing Sheets

UI Aspect Ratio 1 : 2.2

UI Aspect Ratio 1 : 1.1

DYNAMICALLY ADAPTIVE SENSING FOR REMOTE HOVER TOUCH

TECHNICAL FIELD

This disclosure relates generally to an electronic device with a hover touch capability, and more particularly; utilizing a hover touch controller device to communicate spatial input to a display device.

BACKGROUND

A variety of displays of varying forms and sizes can limit the user interface interactions that they support. In particular, many types of direct touch interactions are not supported by a variety of displays. For example, television monitors and Head Mounted Displays (HMDs) are not well suited for direct touch interaction, such as due to proximity. Televisions are typically viewed at a comfortable viewing distance away from the user. This distance is typically too far away from the user to allow direct touch interaction with the television. In contrast to a television, the display of an HMD is typically viewed at a distance that is in close proximity to the user's face. This distance is typically too near the user to allow direct touch interaction with the display of HMD. In a Virtual Reality (VR) environment, wearing an HMD may further prevent the user from directly seeing their hands or handheld input devices. This severely limits the variety and quality of interactions that the user can perform. Even when the user's hands are visible in Augmented Reality (AR) and Mixed Reality (MR) goggles, performing all virtual world interactions with free hand gestures is cumbersome. For example, alphanumeric input is especially difficult to perform with free hand input.

The alternatives to direct on-screen touch input also have limitations. For example, while traditional remote controllers and game controllers may have buttons, d-pads, knobs, joysticks and other physical input elements suitable for simple tasks these inputs are typically not well suited for direct spatial input. Touch remotes, while small, are not suitable for direct spatial selection because the user does not know where they are going to touch, until they make their first touch. While remotes with motion tracked input allow orientation and/or position to be used as inputs they perform poorly with alpha numeric and textual inputs. While second screen devices may be used as digital remote controls and input devices for displays, they divide the user's attention between screens adversely affecting the viewing experience.

In contrast to the traditional controllers described above, a hover touch controller device is better suited to be an alternative to direct on-screen touch input. The hover touch controller device includes a touch sensor and a proximity sensor. A touch event, including information on when and where a user touches the surface of the touch sensor is detected. Additionally, hover-input events, including information on pre-touch events and post-touch events are detected. The hover-input events correspond to a user's finger hovering over the touch sensor within some maximum depth. A display device generates visualizations based on the hover events and the touch events. This can include providing visual feedback in a hover mode where a user's finger is hovering over the touch sensor. However, current hover touch controller devices exhibit issues with supporting a variety of Graphical User Interfaces (GUIs) designs that need to be addressed to fully exploit their potential.

SUMMARY

Embodiments of the present disclosure provide correction for issues associated with supporting a variety of Graphical User Interface (GUI) designs when using a hover touch controller device.

In certain embodiments, an apparatus for communicating spatial input is provided. The apparatus includes a touch surface having a first aspect ratio and a processor configured to retrieve a second aspect ratio of an interactive surface. The second aspect ratio of the interactive surface being different from the first aspect ratio of the touch surface. The processor further configured to form an active area of the touch surface by adjusting the first aspect ratio to correspond to the second aspect ratio and communicate spatial information to an indicator on the interactive surface describing the position of the interactive device with respect to the active area.

In another embodiment, a method for communicating with an interactive device is provided. The method includes determining a first aspect ratio of a touch surface and determining a second aspect ratio of an interactive surface. The method further includes monitoring for a difference between the second aspect ratio and the first aspect ratio and responsive to identifying the second aspect ratio being different from the first aspect ratio forming an active area of the touch surface by adjusting the first aspect ratio to correspond to the second aspect ratio. The method further includes communicating spatial information to an indicator on the interactive surface describing the position of the interactive device with respect to the active area.

In yet another embodiment, a computer program product residing on a non-transitory computer-readable storage medium having a plurality of instructions stored thereon which, when executed by a processor, cause the processor to communicate with an interactive device which include determining a first aspect ratio of a touch surface and determining a second aspect ratio of an interactive surface. The computer program product further causes the processor to monitor for a difference between the second aspect ratio and the first aspect ratio and responsive to identifying the second aspect ratio being different from the first aspect ratio forming an active area of the touch surface by adjusting the first aspect ratio to correspond to the second aspect ratio. The computer program product further causes the processor to communicate spatial information to an indicator on the interactive surface describing the position of the interactive device with respect to the active area.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments of the present disclosure provide for a hover touch controller device including a touch sensor having a touch surface with a first aspect ratio and a proximity sensor. Information on when and where a user touches the touch surface is detected. Additionally, information on hover-input events is detected. The hover-input events correspond to a user's finger hovering over the touch surface within some maximum depth. The hover touch controller device further includes a controller. The processor communicates three-dimensional spatial information to a Graphical User Interface (GUI). The GUI generates visualizations based on the hover events and the touch events on a display having an interactive surface with a second aspect ratio. The processor further corrects for any issues associated with supporting a variety of GUI designs. This can include correcting for a difference between the first aspect ratio and the second aspect ratio.

Figure 1:
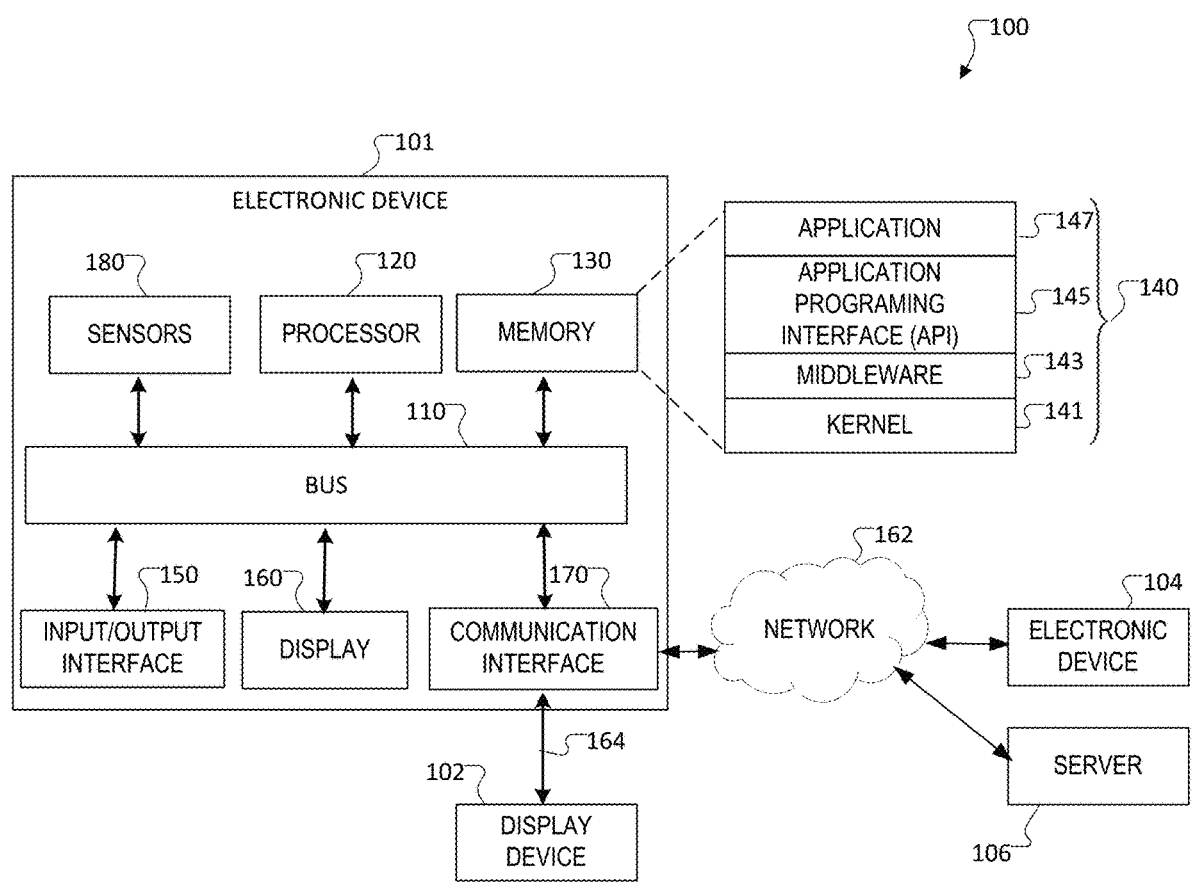
FIG. 1 illustrates an example of an electronic device according to an embodiment of this disclosure.

FIG. 1 illustrates an example electronic device in a network environment 100 according to various embodiments of the present disclosure. The embodiment of the electronic device 101 and the network environment 100 shown in FIG. 1 is for illustration only. Other embodiments of the electronic device 101 and network environment 100 could be used without departing from the scope of this disclosure.

According to an embodiment of the present disclosure, an electronic device 101 is included in a network environment 100. The electronic device can be coupled to a display device 102. The electronic device 101 can include at least one of a bus 110, a processor 120, a memory 130, an input/output (IO) interface 150, a display 160, a communication interface 170, or sensors 180. In some embodiments, the electronic device 101 can exclude at least one of the components or can add another component.

The bus 110 includes a circuit for connecting the components 120 to 170 with one another and transferring communications (e.g., control messages and/or data) between the components.

The processor 120 includes one or more of a central processing unit (CPU), an application processor (AP), or a communication processor (CP). The processor 120 is able to perform control on at least one of the other components of the electronic device 101, and/or perform an operation or data processing relating to communication.

The memory 130 can include a volatile and/or non-volatile memory. For example, the memory 130 can store commands or data related to at least one other component of the electronic device 101. In various embodiments, the memory 130 can store spatial map data that can include mapping information of a real environment such as the interior of an office building, mall, house, amusement park, neighborhood or any other real world or virtual world mapping information utilized by an application 147 on the electronic device 101. According to an embodiment of the present disclosure, the memory 130 stores software and/or a program 140. The program 140 includes, e.g., a kernel 141, middleware 143, an application programming interface (API) 145, and/or an application program (or "application") 147. At least a portion of the kernel 141, middleware 143, or API 145 can be denoted an operating system (OS).

For example, the kernel 141 can control or manage system resources (e.g., the bus 110, processor 120, or a memory 130) used to perform operations or functions implemented in other programs (e.g., the middleware 143, API 145, or application program 147). The kernel 141 provides an interface that allows the middleware 143, the API 145, or the application 147 to access the individual components of the electronic device 101 to control or manage the system resources.

The middleware 143 can function as a relay to allow the API 145 or the application 147 to communicate data with the kernel 141, for example. A plurality of applications 147 can be provided. The middleware 143 is able to control work requests received from the applications 147, e.g., by allocating the priority of using the system resources of the electronic device 101 (e.g., the bus 110, the processor 120, or the memory 130) to at least one of the plurality of applications 147.

The API 145 is an interface allowing the application 147 to control functions provided from the kernel 141 or the middleware 143. For example, the API 145 includes at least one interface or function (e.g., a command) for filing control, window control, image processing, or text control.

The IO interface 150 serve as an interface that can, e.g., transfer commands or data input from a user or other external devices to other component(s) of the electronic device 101. Further, the IO interface 150 can output commands or data received from other component(s) of the electronic device 101 to the user or the other external device.

The display 160 includes, e.g., a liquid crystal display (LCD), a light emitting diode (LED) display, an organic light emitting diode (OLED) display, or a microelectromechanical systems (MEMS) display, or an electronic paper display. The display 160 is able to display, e.g., various contents (e.g., text, images, videos, icons, or symbols) to the user. The display 160 can include a touchscreen and may receive, e.g., a touch, gesture, proximity or hovering input using an electronic pen or a body portion of the user.

For example, the communication interface 170 is able to set up communication between the electronic device 101 and an external electronic device (e.g., a display device 102, a second external electronic device 104, or a server 106). For example, the communication interface 170 can be connected with the network 162 or 164 through wireless or wired communication to communicate with the external electronic device. The communication interface 170 can be a wired or wireless transceiver or any other component for transmitting and receiving signals, such as video feeds or video streams. Additionally, the communication interface 170 can include a near field communication capability to perform a near field communication directly with another device, such as display device 102. For example, communication interface 170 can include a BLUETOOTH transceiver, a ZIGBEE transceiver, a WI-FI transceiver, and the like, a magnetic connection, or an optical communication. In certain embodiments, the display device 102 is coupled to the electronic device via a wired or wireline connection.

Electronic device 101 further includes one or more sensors 180 that can meter a physical quantity or detect an activation state of the electronic device 101 and convert metered or detected information into an electrical signal. For example, sensor 180 can include one or more buttons for touch input, a camera, a gesture sensor, a gyroscope or gyro sensor, an air pressure sensor, a magnetic sensor or magnetometer, an acceleration sensor or accelerometer, a depth or distance sensor, a grip sensor, a proximity sensor, a color sensor (e.g., a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared sensor (IR) sensor, an ultrasound sensor, an iris sensor, a fingerprint sensor, and the like. The sensor(s) 180 can further include a control circuit for controlling at least one of the sensors included therein. Any of these sensor(s) 180 can be located within the electronic device 101. A camera sensor 180 can capture a plurality of frames for a single image to be combined by the processor 120.

In certain embodiments, an external electronic device, such as a wearable device or an electronic device 101-mountable wearable device (e.g., an optical head mounted display (HMD)) is provided. When the electronic device 101 is mounted in the HMD, the electronic device 101 detects the mounting in the HMD and operates as a display device 102, such as in an augmented reality mode. In certain embodiments, the electronic device 101 detects the mounting in the HMD and operate in an augmented reality mode. When the electronic device 101 is mounted in the HMD, the electronic device 101 communicates with the HMD through the communication interface 170. The electronic device 101 can be directly connected with the HMD to communicate with the HMD without involving a separate network.

The wireless communication is able to use a wireless communication medium, such as at least one of, e.g., long term evolution (LTE), long term evolution-advanced (LTE-A), 5th generation wireless system (5G), mm-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include at least one of universal serial bus (USB), high definition multimedia interface (HDMI), recommended standard 232 (RS-232), or plain old telephone service (POTS).

The network 162 includes at least one of communication networks. Examples of communication include a computer network (e.g., local area network (LAN) or wide area network (WAN)), Internet, or a telephone network.

The external electronic devices 104 and server 106 each can be a device of the same or a different type from the electronic device 101. According to certain embodiments of the present disclosure, the server 106 includes a group of one or more servers. According to certain embodiments of the present disclosure, all or some of operations executed on the electronic device 101 can be executed on another or multiple other electronic devices (e.g., the electronic device 104 or server 106). According to certain embodiments of the present disclosure, when the electronic device 101 should perform some function or service automatically or at a request, the electronic device 101, instead of executing the function or service on its own or additionally, can request another device (e.g., electronic device 104 or server 106) to perform at least some functions associated therewith. The other electronic device (e.g., electronic device 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique can be used, for example.

Although FIG. 1 shows that the electronic device 101 includes the communication interface 170 to communicate with the external electronic device 104 or server 106 via the network 162, the electronic device 101 can be independently operated without a separate communication function, according to an embodiment of the present disclosure.

The server 106 can support to drive the electronic device 101 by performing at least one of operations (or functions) implemented on the electronic device 101. For example, the server 106 can include a processing module or processor that may support the processor 120 implemented in the electronic device 101.

For example, the electronic device 101 can include an event processing module, such as within processor 120. The event processing module can process at least part of information obtained from other elements (e.g., the processor 120, the memory 130, the input/output interface 150, or the communication interface 170) and can provide the same to the user in various manners. The server event processing module can include at least one of the components of the event processing module and perform (or instead perform) at least one of the operations (or functions) conducted by the event processing module.

For example, according to an embodiment of the present disclosure, the event processing module processes information related to an event, which is generated while the electronic device 101 is mounted in a wearable device (e.g., as the display device 102) to function as a display apparatus and to operate in the augmented reality mode, to fit the augmented reality mode and display the processed information. When the event generated while operating in the augmented reality mode is an event related to running an application, the event processing module can block the running of the application or process the application to operate as a background application or process.

The event processing module can be separate from the processor 120 or at least a portion of the event processing module can be included or implemented in the processor 120 or at least one other module, or the overall function of the event processing module can be included or implemented in the processor 120 shown or another processor. The event processing module can perform operations according to embodiments of the present disclosure in interoperation with at least one program 140 stored in the memory 130.

Figure 2:
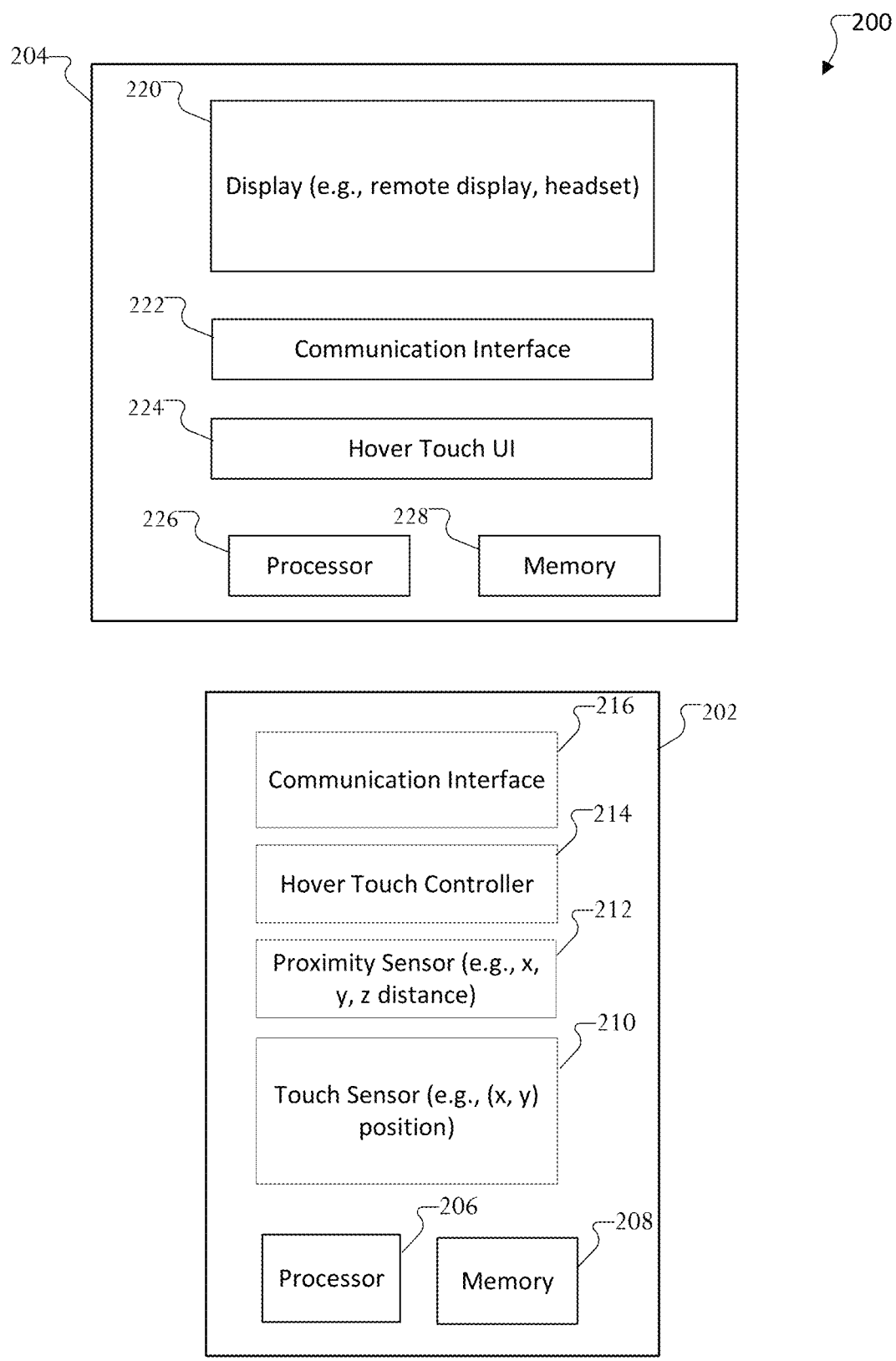
FIG. 2 illustrates a system configured to communicate spatial input to a display device according to an embodiment of the present disclosure.

FIG. 2 illustrates a system 200 to communicate spatial input to a display device according to embodiments of the present disclosure. The embodiment of the system 200 for communicating spatial input to a display device as shown in FIG. 2 is for illustration only. Other embodiments of the system 200 could be used without departing from the scope of this disclosure. In the example shown in FIG. 2, a hover touch controller device 202 is configured to communicate with a display device 204. In certain embodiments, the hover touch controller device 202 can be configured the same as, or similar to, electronic device 101. In certain embodiments, the display device 204 can be configured the same as, or similar to, the display device 102

In certain embodiments, a hover touch controller device 202 includes at least one processor 206 and a memory 208. For example, the at least one processor 206 may include one or more computer processors, microprocessors, or a microcontroller. The memory 208 may include a data storage device supporting program instructions. The at least one processor 206 can be configured by the instructions to function as a special purpose processor to perform one or more methods described herein.

In certain embodiments, the hover touch controller device 202 includes a touch sensor 210 having a two-dimensional (2D) touch surface. The touch sensor 210 may provide two-dimensional (e.g., (x, y)) position information on a point of contact of an interaction device, such as a stylus, a user's finger, and the like, with the two-dimensional touch surface of the touch sensor 210. The touch sensor provides "touch" position information (a "touch") when an interaction device, such as a finger, touches down on the touch surface of the touch sensor.

The hover touch controller device 202 includes a proximity sensor 212 having a three-dimensional field. The proximity sensor 212 is configured to sense a position of an interactive device within a three-dimensional volume (e.g., a position that the user's finger hovers above the surface of the touch sensor 210). The proximity sensor 212 is able provide three-dimensional (e.g., (x, y, z)) position information on when and where a finger or an input device of a user is hovering around a touch surface of touch sensor 210 within a three-dimensional volume space above the touch sensor 210. This information may be described as a "hover-input event" or a "hover" or "hover mode." For example, the user's finger may hover above the touch surface of the touch sensor prior to touching down on the touch surface of the touch sensor. A hover touch controller 214 coordinates the operation of the touch sensor 210 and proximity sensor 212 to generate information on the position of a user's finger relative to the touch surface.

The hover touch controller device 202 also includes a communication interface 216. The communication interface 216 includes a transmitter, receiver, or transceiver capable of transmitting or receiving communications from another device, such as display device 204. For example, the communication interface 216 can include a near field transceiver, such as a BLUETOOTH transceiver or ZIGBEE transceiver, a WI-FI transceiver, an optical interface, a magnetic interface, or the like. The communication interface 216 communicates "hover-input event" information to a display device 204.

In certain embodiments, the display device 204 is a remote display device, such as a television or computer display. In certain embodiments, the display device 204 is another electronic device having a display, such as electronic device 104 or an HMD. In certain embodiments, the hover touch controller device 202 is coupled to, or included with, a headset display device. Additionally, in some embodiments, the hover touch controller device 202 is utilized in combination with another tracking device, such as a 6 degree of freedom tracker. The display device 204 includes a display 220, communication interface 222 configured to communicate with a hover touch controller device 202, hover touch user interface 224, a processor 226, and a memory 228.

The hover touch controller device 202 is an input device for a user to enter inputs for a display device 204. In embodiments in which it is used to control a remote display device 204, the hover touch controller device 202 may also be referred to as a "remote" such as a "remote control" for display device 204.

In some embodiments, the hover touch controller device 202 is used in combination with a head mounted display. It will also be understood that in some embodiments the hover touch controller device 202 is connected to, attached to, or otherwise operated in combination with a head mounted display. For example, the hover touch controller device 202 is collocated with the front face of a head mounted display. In certain embodiments, the hover touch controller device 202 is transparent, or substantially transparent, in order to enable it to be used with see through head mounted display. In some embodiments, the hover touch controller device 202 may contain wireless modules and processing units of its own, which allows it to be detached from the head mounted display and used at hand level. For example, the processor is able to transmit the position of the interactive device wirelessly via a wireless interface such as BLUETOOTH, ZIGBEE or WI-FI to the head mounted display.

In some embodiments, the hover touch controller device is configured to communicate three-dimensional position information to a cursor on an interactive surface of the remote display device 204. The cursor is designed to provide a visual representation of the tracking information on the display. In certain embodiments, the cursor is designed to provide a visual representation of whether the interactive device is operating in the hover volume 405 or the touch zone 410, so that the user can understand the distinct states of input associated with these interactive spaces and navigate accordingly. This cursor, similar to a mouse cursor or that of a trackpad, shows (x, y) movement of the interactive device with respect to touch surface of the hover touch controller device 202. For example, if the interactive device is at an (x, y) coordinate with respect to the touch surface of the touch sensor, the display of the hover touch cursor on the remote display device 204 would be situated at a corresponding position. In addition, in certain embodiments, a different color is associated with the cursor based on whether the interactive device is hovering over the touch surface or touching the touch surface. However, it will be understood that other visual indicators can be used instead of color. For example, the radius of a circle associated with the cursor can correspond directly with the proximity of the interactive device to the touch surface and thereby its z value. The cursor movement and transformation on the remote display device 204 provides the user with comprehensive information about the interaction state of the interactive device with respect to the touch surface of the hover touch controller device 202. That is, the cursor provides a visualization that allows the user to see what objects on the interactive display are going to be touched before the object is touched. This removes the user's need to look down at the hover touch controller device 202 or their hands and work efficiently by just looking at the remote display device 204. This could, for example, increase the speed of typing on the display.

In certain embodiments, the hover touch controller device 202 also includes a processor 206. The processor 206 can configured be to differentiate between three-dimensional position information associated with the interactive device hovering over the touch surface and two-dimensional position information associated with the interactive device touching the touch surface. For example, a calibration can be performed to enable the processor 206 to differentiate between measurements associated with the interactive device hovering over the touch surface verses measurements associated with the interactive device touching the touch surface. The two-dimensional (x, y) coordinates of interactions within the plate can be estimated for both hover and touch. For example, the processor 206 can determine from the three-dimensional position information an (x, y) position for a hover point associated with the interactive device hovering above a projected point on the touch surface. The processor 206 can also determine from the two-dimensional position information an (x, y) position for a touch point associated with the interactive device touching the touch surface. The processor 206 is able to communicate the position of the interactive device with respect to the touch surface of the hover touch controller device 202 to the display device 204.

In some embodiments, the communication interface 216 of the hover touch controller device 202 is configured to transmit the three-dimensional position information associated with the interactive device hovering over the touch surface, having a first aspect ratio, and the two-dimensional position information associated with the interactive device touching the touch surface, to a processor external to the hover touch controller device 202, such as processor 226. In certain embodiments, the processor 226 can determine from the three-dimensional position information an (x, y) position for a hover point associated with the interactive device hovering above a projected point on the touch surface. The processor 226 can also determine from the two-dimensional position information an (x, y) position for a touch point associated with the interactive device touching the touch surface. In certain embodiments, the processor 226 can retrieve a second aspect ratio of an interactive surface on the display device 204. In certain embodiments, the processor 226 is able to form an active area of the touch surface by adjusting the first aspect ratio to correspond to second aspect ratio. In certain embodiments, the processor can communicate spatial information to an indicator on the interactive surface of the display device 204 describing the position of the interactive device with respect to the active area. That is, although the present disclosure will be described in conjunction with specific embodiments of processor 206, it will be understood that it is not the intention to limit the invention to the described embodiments. On the contrary, it is intended to cover alternatives, modifications, and equivalents as may be suggested to one skilled in the art within the scope of the appended claims.

In some embodiments, the hover touch cursor is used as part of a larger user interface scheme. For example, in certain embodiments, the hover touch cursor and tracking are utilized to provide the equivalent of direct spatial input on the remote display device 204, where a direct spatial input means the user gets a visual feedback from the display of where their fingers are hovering and when and where they are about to touch. In essence, this is the equivalent to a direct spatial input on the remote display device 204. In particular, the visual feedback for the hover mode makes the interaction as easy as directly interacting with a mobile device with multi-touch.

Figure 3:
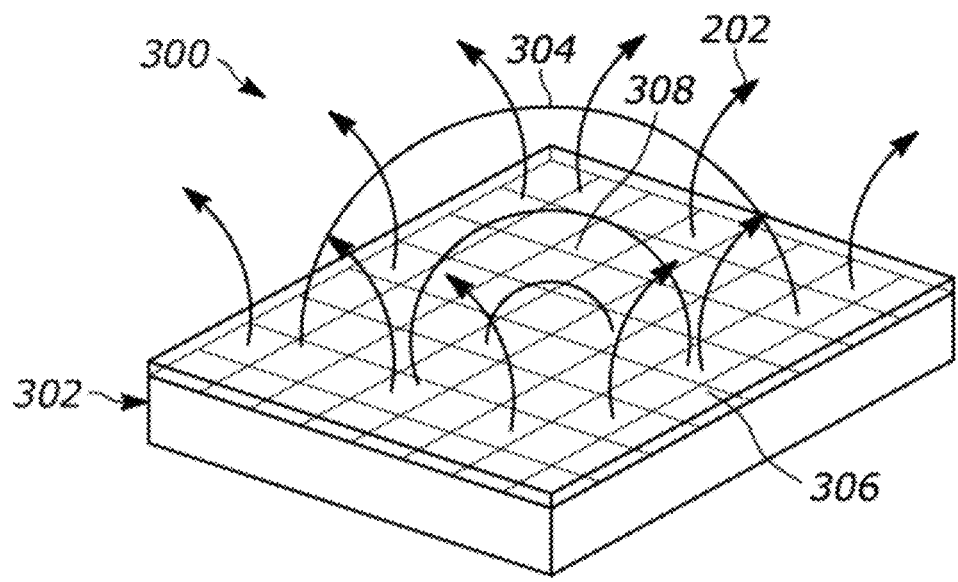
FIG. 3 illustrates an example of the hover touch controller device sensor fields according to embodiments of the present disclosure.

FIG. 3 illustrates an example of the sensor fields of the hover touch controller device 202 according to embodiments of the present disclosure. The embodiment of the sensor fields 300 shown in FIG. 3 is for illustration only. Other embodiments could be used without departing from the scope of the present disclosure.

In the example, shown in FIG. 3, an input sensor 302 is depicted. The input sensor 302 can be the same as, or included as part of, proximity sensor 212 or touch sensor 210. In certain embodiments, the input sensor 302 includes a two-dimensional rectangular plate or touch surface. The input sensor 302 further includes a proximity sensor or proximity sensing capability. The proximity sensor is configured to provide three-dimensional position information of an interactive device hovering over the touch surface 306. For example, the input sensor 302 can comprise a projected capacitive sensor configured to provide an electric field 304 around the touch surface 306, which when disturbed by the presence of the interactive device hovering over the touch surface 306, can be measured. That is, when an input device, such as a finger of the user, disturbs a hover area 308 over the input sensor 302, the input sensor 302 can detect and measure the disturbance caused by the input device. The input sensor 302 further includes a contact sensor or contact sensing capability. The contact sensor is configured to provide two-dimensional position information of the interactive device contacting the touch surface 306. For example, the input sensor 302 can comprise a projected capacitive sensor configured to provide an electric field over the touch surface 306, which when disturbed by the presence of the interactive device contacting the touch surface, can be measured.

Figure 4A:
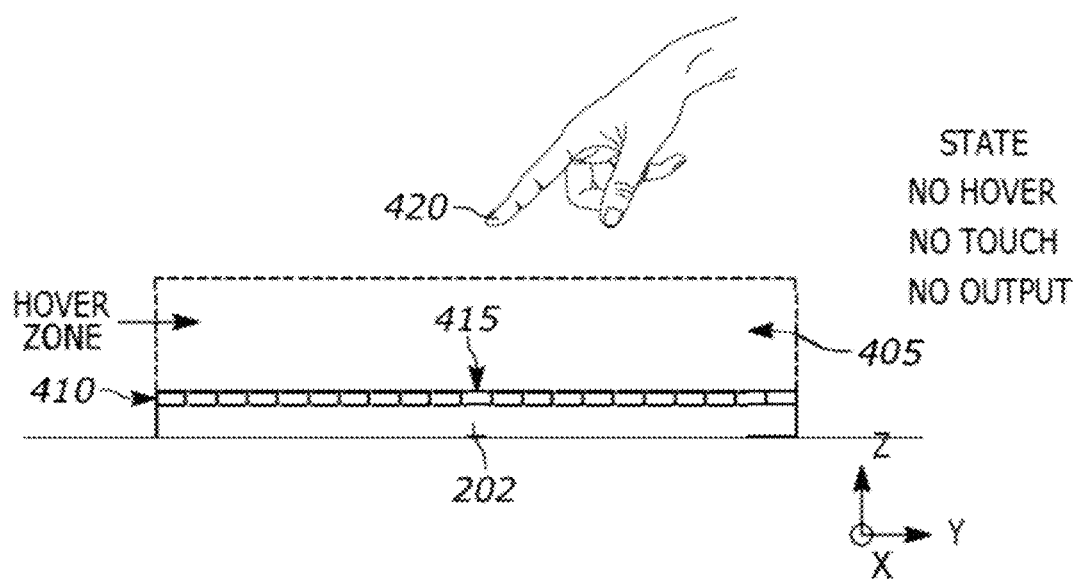
FIGS. 4A, 4B, and 4C illustrate examples of interaction states according to embodiments of the present disclosure.
Figure 4B:
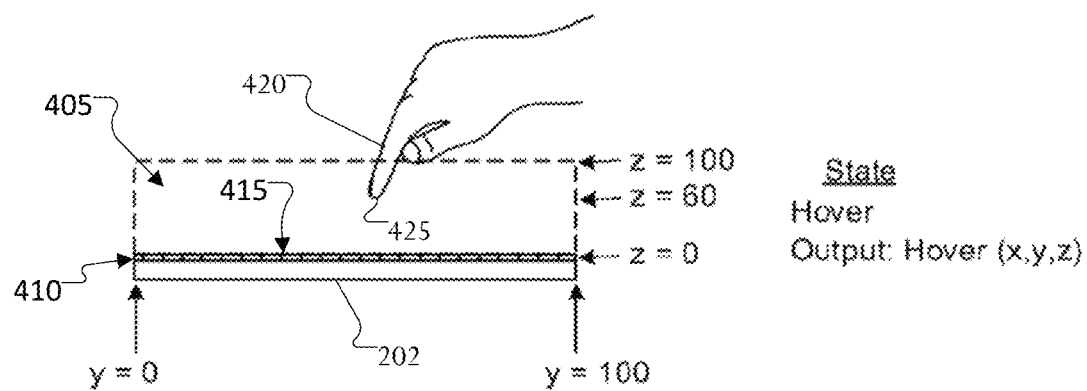
Figure 4C:
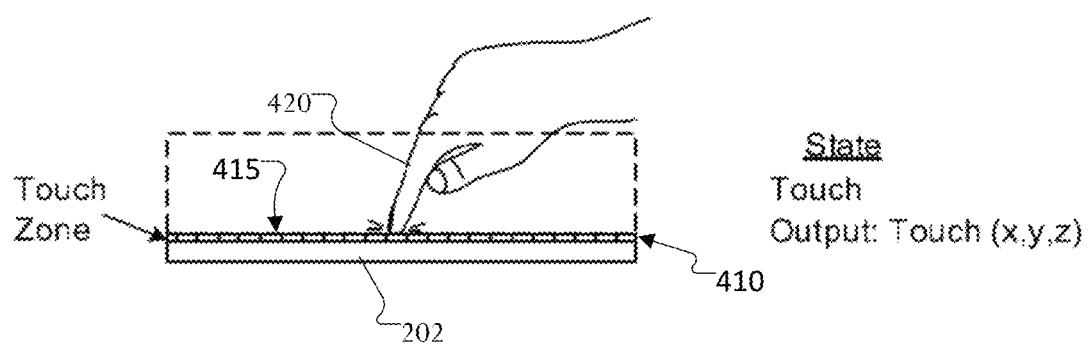

FIGS. 4A, 4B, and 4C illustrate examples of interaction states according to embodiments of the present disclosure. The embodiments of the interaction states shown in FIGS. 4A, 4B, and 4C are for illustration only. Other embodiments could be used without departing from the scope of the present disclosure.

A set of tracking and interaction states can be defined for the tracking and touch data of a hover touch controller device. In certain embodiments, an interaction space for the hover touch controller device 202 can be categorized into two zones: a hover volume 405 and touch zone 410. As used herein, a "hover volume" 405 (illustrated by dashed lines) is a volume just above the surface 415 of the hover touch controller device 202. As used herein, a "touch zone" 410 is the surface of the hover touch controller device.

In the example shown in FIG. 4A, the interactive device 420, such as finger of the user, is outside of the hover volume 405, which corresponds to a state in which there is no hover (no z data), no touch, and no output. In the example FIG. 4B, the interactive device 420 is in the hover volume 405. Full 3D tracking is available within the volume of the hover volume 405 and the interactive device 420 can be tracked. Additionally, while in the hover volume 405, a position of the interactive device 420 is expressed in 3D coordinates as (x, y, z). The z value of the position of the interactive device 420 corresponds to a depth of the tip 425 of the interactive device 420 and, can be used to estimate the proximity of the tip 425 of the interactive device 420 to the touch surface 415. In the example shown in 4C the interactive device 420 is in the touch zone 410, (z=0), which corresponds to the touch surface 415 of the hover touch controller device 202. In the touch zone 410, 3D tracking coordinates can be provided in the form (x, y, 0). Alternatively, 2D tracking could be provided in the form (x, y) because z=0.

It will also be understood that there are many distinct states of input for the hover touch controller device 202. In certain embodiments, the distinct states for hover touch controller device 202 can be categorized into 7 input states, OUTSIDE, HOVER_ENTER, HOVER_MOVE, TOUCH_DOWN, TOUCH_MOVE, TOUCH_UP, and HOVER_EXIT. As used herein, the "OUTSIDE" state occurs when the interactive device is outside of the hover volume 405. As used herein, the "HOVER_ENTER" state occurs when the interactive device has just entered the hover volume 405. HOVER_ENTER is a discrete state and occurs only once in the transition from outside to inside the hover volume 405. As used herein, the "HOVER_MOVE" state occurs when the interactive device is moving around within the hover volume 405 without touching the touch surface of the hover touch controller device 202. HOVER_MOVE is a continuous state occurring over multiple display frames. As used herein, the "TOUCH_DOWN" state occurs when the interactive device touches the touch surface of the hover touch controller device 202. TOUCH_DOWN is a discrete state and occurs only once in the transition from the hover volume 405 to the touch zone 410. As used herein, TOUCH_MOVE occurs when the interactive device has TOUCH_DOWN and is moving across the touch surface of the hover touch controller device 202. TOUCH_MOVE is a continuous state occurring over multiple display frames. As used herein, the "TOUCH_UP" state occurs when the interactive device transitions between either the TOUCH_DOWN state or the TOUCH_MOVE state, and the HOVER_MOVE state. TOUCH_UP is a discrete state and occurs only once during the transition between touch and hover. As used herein, the "HOVER_EXIT" state occurs when the interactive device has just left the hover volume 405. HOVER_EXIT is a discrete state and occurs only once when the interactive device transitions from inside the hover volume 405 to outside the hover volume 405.

In some embodiments, the hover touch controller device 202 is used in combination with a head mounted display. In some embodiments the hover touch controller device 202 can be connected to, attached to, or otherwise operated in combination with a head mounted display. For example, the hover touch controller device 202 can be collocated with, or disposed on or proximate to, the front face of a head mounted display. In certain embodiments, the hover touch controller device 202 is transparent, or substantially transparent, in order to enable it to be used with see through head mounted display. In some embodiments, the hover touch controller device 202 contains wireless modules and processing units of its own, which allows it to be detached from the head mounted display and used at hand level. For example, the processor 206 can transmit the position of the interactive device 420 wirelessly via a wireless interface such as BLUETOOTH, ZIGBEE, or WI-FI to the head mounted display.

In certain embodiments, the processor 206 coordinates the operation of the touch sensor 210 and proximity sensor 212 to generate information on the position of a user's finger relative to the touch surface 415. This may include determining from the two-dimensional (x, y) position information a position relative to the two dimensional surface of the touch surface 415 of the touch sensor 210, such as (x, y) information, indicating that the user's finger has touched the touch surface 415 of the touch sensor 210. This position may be called a "contact point". The processor 206 further determines, from the three-dimensional (x, y, z) position information, a position relative to the two dimensional surface of the touch surface 415 of the touch sensor 210, such as ($x^1$, $y^1$) information, indicating that the user's finger is hovering above a point projected on the touch surface 415 of the touch sensor 210, this position may be called a "hover point". Thus, information is generated describing "touch" interactions and "hover" interactions.

Conventional hover touch controller devices exhibit issues with the user's perception of the information generated. For example, when a user's finger moves over or across the touch surface 415, the user may experience an unsatisfactory interaction, when it comes to how their fingers move and the corresponding information generated by the hover touch controller device 202. There are several reasons for this. One reason may be the result of a mismatch between the aspect ratio of the touch surface 415 and the aspect ratio of an interactive surface of a GUI design for the display that causes a feeling of slippage, and to account for this mismatch in the design process. Responsive to the processor 206 determining a mismatch between the aspect ratio of the touch surface 415 and the aspect ratio of the interactive surface of a GUI design, the processor 206 forms an active area of the touch surface 415 to correspond to the aspect ratio of the interactive surface. The processor 206 communicates via a communication interface 216 to an indicator on the interactive surface of the display 204 the position of the interactive device with respect to the active area. As used herein, an "active area" of the touch surface 415 is a portion of the touch zone 410 having an aspect ratio matching the aspect ratio the interactive surface. It is also a portion of the hover volume 405 just above the portion of the touch zone 410 matching the aspect ratio of the interactive surface. That is, the active area includes the volume just above the surface of the hover touch controller device matching the aspect ratio of the interactive device.

In certain embodiments the hover touch controller device is able to operate as an absolute interaction device. As used herein, an "absolute interaction" generally refers to a 1:1 mapping between the touch surface 415 of the hover touch controller device 202 and the interactive surface of the GUI design. For example, the touch input overlaying a tablet is an absolute interaction device, because when a touch interaction occurs at an (x, y) location of the interactive surface of the tablet the corresponding location of the cursor or indicator on the interactive surface of the GUI design is also at the aforementioned (x, y) location. The absolute location(s) at which the touch, drag, and release, occur are significant to the user's perception of the interaction in an absolute interactive device. For this reason, absolute interactive devices require the aspect ratio of the input to closely match the aspect ratio of the interactive surface of the GUI design.

In certain embodiments, the hover touch controller device is able to operate as a relative interaction device. As used herein, a "relative interaction" generally refers to communicating a change in position of an interactive device in relation to the touch surface 415 of the hover touch controller device 202 to the interactive surface of the GUI design. For example, a trackpad is a relative interaction device, because when a touch occurs at an (x, y) location of the interactive surface of the trackpad followed by a drag to an (x', y') location the corresponding position of the cursor/input on the interactive surface of the GUI reflects the relative movement between (x, y) and (x', y'). The absolute location(s) at which the touch and drag/release occur are not significant, only the relative movement between the touch and drag/release is significant to the user's perception of the interaction in a relative interactive device. For this reason, relative interactive devices do not require the aspect ratio of the input to closely match the aspect ratio of the interactive surface of the GUI design.

As used herein, "aspect ratio" generally refers to the ratio of the width to the height of the touch surface, a monitor, or the interactive surface of a display in a GUI design. The aspect ratio can be fixed. For example, the aspect ratio for the screen of a physical device such as a monitor is fixed. The aspect ratio can be dynamic and vary in real time. For example, the aspect ratio for the interactive surface of a display in the GUI design can vary with a menu selection or the loading of a different application. The hover touch controller device 202 is a physical device and the aspect ratio of the touch surface 415 is fixed.

In some embodiments, the hover touch controller device 202 is able to operate as an absolute interaction device. As used herein, an "absolute interaction" generally refers to a 1:1 mapping between the touch surface 415 of the hover touch controller device 202 and the interactive surface of the GUI design on the display device 204. The hover touch controller device 202 is able to operate in an environment with a display device 204 having an aspect ratio that does not match the aspect ratio of the touch surface 415 of the hover touch controller device 202. For example, the hover touch controller device 202 is able to operate as an absolute interaction device in a virtual reality environment where the interactive surface of the virtual display does not match the aspect ratio of the touch surface 415. Further, the aspect ratio of interactive display is dynamic and vary in real time in accordance with various menu selections. Even further, the aspect ratio is able to vary dynamically in accordance with the application(s) that are being executed within the virtual reality environment. The fixed aspect ratio of the touch surface 415 therefore constrains the applicability of the hover touch controller device 202 in such an environment.

In some embodiments, the processor 206 is able to determine from the three-dimensional position information an (x, y) position for a hover point associated with the interactive device 420 hovering above a projected point on the touch surface 415. Moreover, the processor 206 is able to determine from the three-dimension position information a (z) position for the height of the interactive device 420 above the hover point projected on the touch surface 415, which results in full 3D tracking of the interactive device 420. The hover touch controller device 202 is used in combination with other tracking information. In certain embodiments the hover touch controller device 202 is used with a six degrees of freedom device. The six degrees of freedom device is able to provide tracking information with respect to 3-dimensional position (x, y, z) and orientation (pitch, yaw, roll). In certain embodiments, the hover touch controller device 202 is combined with the six degrees of freedom device to provide a hybrid device that provides contextual information on where the user is intending to interact with interactive surface of the virtual display. The hover touch controller device 202 can be permanently attached to the six degrees of freedom device. Alternatively, the hover touch controller device 202 is detachably attached to the six degrees of freedom device. While a six degrees of freedom device is provided as an example, a hover touch controller device 202 can be combined with other tracking devices.

In some embodiments, the hover touch controller device includes a touch sensor 210 having a touch surface 415 with a first aspect ratio. The hover touch controller device 202 further includes a processor 206. The processor 206 communicates three-dimensional spatial information to a Graphical User Interface (GUI). The GUI generates visualizations based on the hover events and the touch events on a display device 204 having an interactive surface with a second aspect ratio. In certain embodiments the processor 206 controls the touch surface 415 to form an active area 510 corresponding to the first aspect ratio. For example, processor 206 is able to configure a first portion of the touch surface 415 to be an active area 510 and a second portion of the touch surface 415 to be an inactive region, such that, the aspect ratio of the active area 510 matches the second aspect ratio of the interactive surface of the display. In certain embodiments, the processor 206 is configured to communicate only hover events and touch events that occur within the active area 510 to the GUI, which represents the three-dimensional spatial information with a cursor on the interactive surface. For example, the processor 206 is able to monitor and report only the active area 510 for hover events and touch events.

In some embodiments, the aspect ratio of the GUI display is dynamic, and the processor 206 is configured to change the aspect ratio of the active area 510 of the touch surface 415 in real-time to match the aspect ratio of the GUI display. For example, the aspect ratio of the GUI display is able to change with a menu selection within the GUI design or with an application selection. In certain embodiments, the processor 206 is configured to determine the second aspect ratio. For example, the processor 206 is configured to determine the aspect ratio for the active area 510 based on the GUI registering the selected Menu Aspect Ratio (MAR) or the selected application aspect ratio in the system. In another example, the processor 206 is configured to determine the aspect ratio of the active area 510 based on an orientation of the display device 204 or an inertial measurement unit. In yet another example, the processor 206 is configured to determine the aspect ratio of the active area 510 based on the cursor transitioning from a first interactive display surface to a second interactive display surface in a split screen system supporting landscape mode and portrait mode. In yet another example, the processor 206 is configured to determine the aspect ratio of the active area 510 based on whether the active interactive display is an unfolded display surface or a folded display surface of a folding phone. In yet another example, the processor 206 is configured to determine the aspect ratio of the active area. 510 of the hover touch controller device 202 based on whether the cursor interaction with the interactive display surface, is a relative interaction, or is an absolute interaction.

In certain embodiments, the processor is configured to maximize the area of the active area 510. The processor 206 is able to use an algorithm to maximize the area of the active area 510 having the registered MAR about a center of the touch surface 415. For example, if the registered MAR indicates that the user has selected a menu having an aspect ratio of 1:2, but the touch surface 415 has an aspect ratio of 1:1, the algorithm will automatically figure out the largest rectangle of aspect ratio 1:2 that can fit on the touch surface 415, and place it in the center of the touch surface 415. The algorithm effectively divides the touch surface 415 into 2 regions. An active area 510 and an inactive region. Only interactions that occur in the active area 510 corresponding to the MAR will be communicated to the GUI. Any interactions that occur in the inactive region will not be communicated to the GUI and will not contribute to the cursor input on the interactive area of the GUI design.

Figure 5:
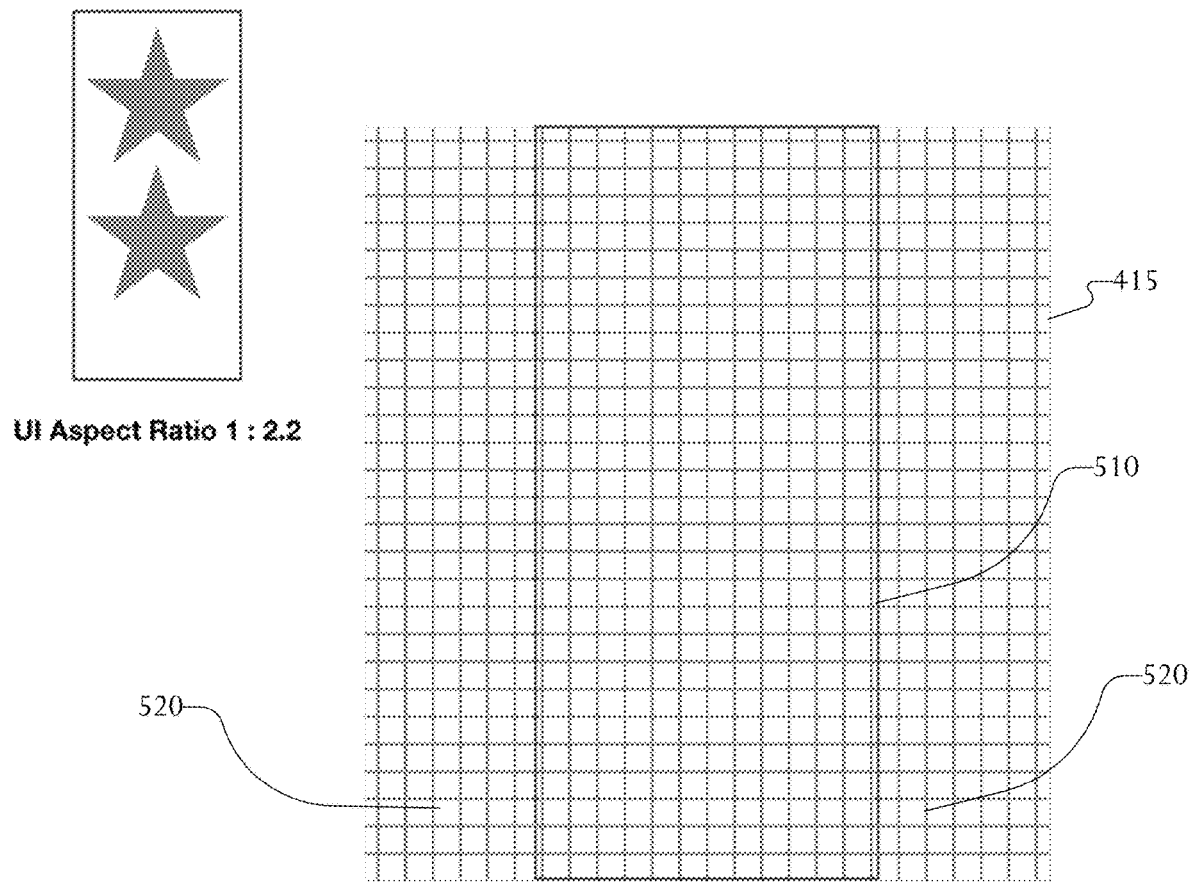
FIG. 5 illustrates an example of a formed active area according to embodiments of the present disclosure.

FIG. 5 illustrates an example of a formed active area 510 according to embodiments of the present disclosure. The embodiment of the formed active area 510 shown in FIG. 5 is for illustration only. Other embodiments could be used without departing from the scope of the present disclosure.

In the example shown in FIG. 5, the touch surface of the hover touch controller device 202 is substantially square having an aspect ratio of about 1:1. In contrast, to the 1.1 aspect ratio of the touch surface 415, the registered MAR indicates that the user has selected a menu within the GUI having an aspect ratio of about 1:2.2. In response, to the user's selection the processor 206 is configured to form an active area 510 on the touch surface 415 having an aspect ratio corresponding to the registered MAR. In certain embodiments, the processor 206 is able to maximize the size of the active area 510 by further forming the active area 510 about a center of the touch surface 415. As illustrated in FIG. 5, the touch surface 415 is able to have an active area 510 and one or more inactive region(s) 520 located outside of the active area 510 of the touch surface 415. The processor 206 is further configured to differentiate between the interactive device 420 interacting with the touch surface 415 within the active area 510 and the interactive device 420 interacting with the touch surface 415 within the inactive region(s) 520. For example, when the processor 206 determines from the three-dimensional information that the interactive device 420 is hovering or touching the active area 510 of the touch surface 415, the processor 206 will communicate the three-dimensional information to a cursor on the interactive surface. The cursor will therefore describe the position of the interactive device 420 with respect to the aspect ratio of the active area 510, which will be the same as the MAR of the interactive surface. In contrast, when the processor 206 determines from the three-dimensional information that the interactive device 420 is hovering or touching the inactive region 520 of the touch surface 415 the processor 206 will not communicate the three-dimensional information to the cursor on the interactive surface. In certain embodiments, the processor 206 is able to report the last known position of the interactive device 420 within the active area 510 when the processor 206 determines that the interactive device 420 is located within the inactive region 520.

Figure 6A:
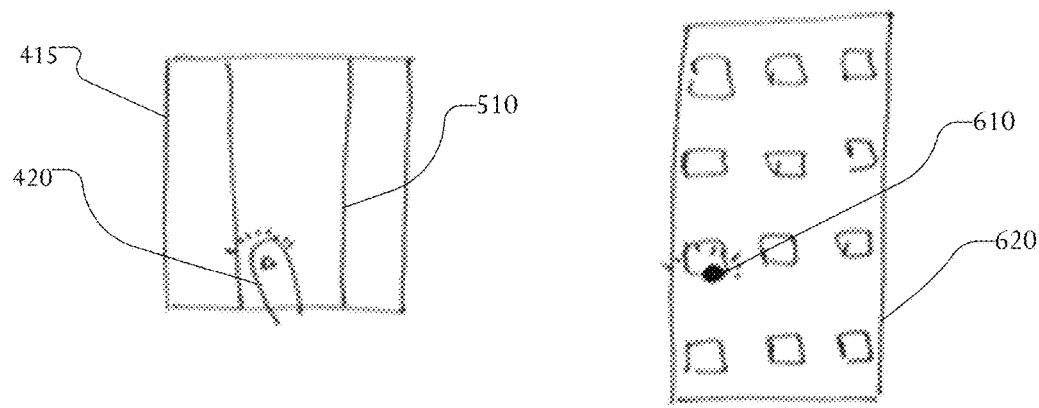
FIGS. 6A and 6B illustrate examples of interactions with a formed active area according to embodiments of the present disclosure.
Figure 6B:
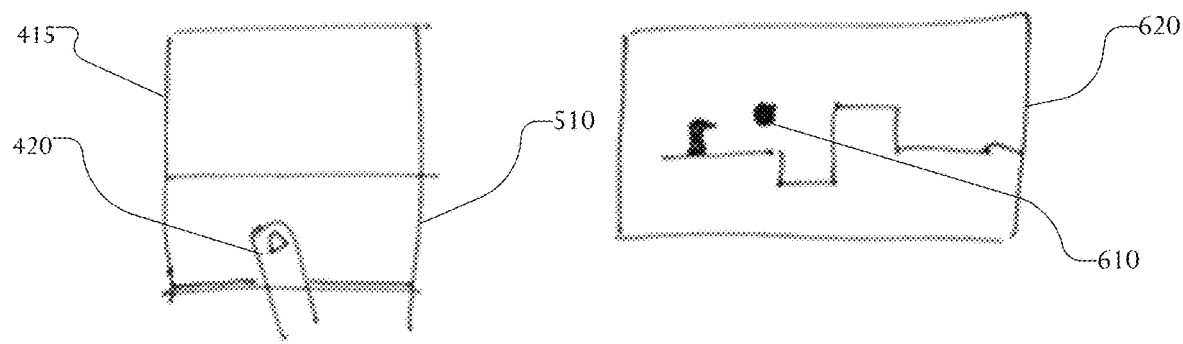

FIGS. 6A and 6B illustrate examples of interactions with a formed active area according to embodiments of the present disclosure. The embodiment of the formed active area 510 shown in FIGS. 6A and 6B are for illustration only. Other embodiments could be used without departing from the scope of the present disclosure.

In the example shown in FIG. 6A, the aspect ratio of the registered MAR is 1:2 and the corresponding aspect ratio of the active area 510 formed on the touch surface 415 is also 1:2 As illustrated, the interactive device 420 is a user's finger. The position of the user's finger, as described in coordinate terms, is (0.2, 0.4) with respect to the bottom left corner of the active area 510. That is, in percentage terms, the finger is located at a position that corresponds to 20% of the width of the active area 510 and 40% of height of the active area 510. The corresponding position of the cursor 610, as described in coordinate terms, is (0.2, 0.4) with respect to the bottom left corner of the interactive surface 620 of the GUI menu. That is, in percentage terms, the cursor 610 is located at a position that corresponds to 20% of the width of the interactive surface 620 and 40% of the height of the interactive surface 620. Therefore, the user's finger and the cursor 610 are located at the same relative position. Further, because the active area 510 has been formed with an aspect ratio that matches the MAR the hover touch controller device 202 is able to operate as an absolute interaction device. As will be understood, while the hover touch controller device 202 has been configured to operate as an absolute interaction device, the physical size of the active area 510 and the interactive surface 620 are different even though their aspect ratios are the same.

In some embodiments, the aspect ratio of the interactive surface 620 is able to change as the user moves through an application, and the processor 206 is configured to form the active area 510 of the touch surface 415 based on a change of the interactive surface 620. For example, as the user operates through an application the processor 206 is able to dynamically reform the active area 510 of the touch surface 415 in response to the user focusing on different menus, having different aspect ratios, within the GUI design. The processor 206 is able to form the active area 510 with the updated aspect ratio using a best fit algorithm. For example, the algorithm is able to maximize the size of the formed active area 510 about the center of the touch surface 415. In some embodiments, the aspect ratio dynamically adapts in response to an action. For Example, the aspect ratio of the registered MAR is 1.2 in FIG. 6A and the corresponding aspect ratio of active area 510 formed on the touch surface 415 is also 1:2. In certain embodiments, the MAR configuration of FIG. 6A can be representative of the home screen of a GUI design. That is, home screen of the GUI design has a portrait orientation. In contrast, the aspect ratio of the registered MAR is 2:1 in FIG. 6B and the corresponding aspect ratio of the active area 510 formed on the touch on the touch surface 415 is also 2:1. In certain embodiments, the MAR configuration of FIG. 6B can be representative of an application in the GUI design that the user operates from the home screen. That is, the application has a landscape orientation. In certain embodiments, the active area 510 is able to change in real-time in response to the application being opened. That is, the processor 206 is configured to immediately adapt the aspect ratio of the active area 510 to match the 2:1 aspect ratio of the registered MAR of the application that is opened.

Figure 7:
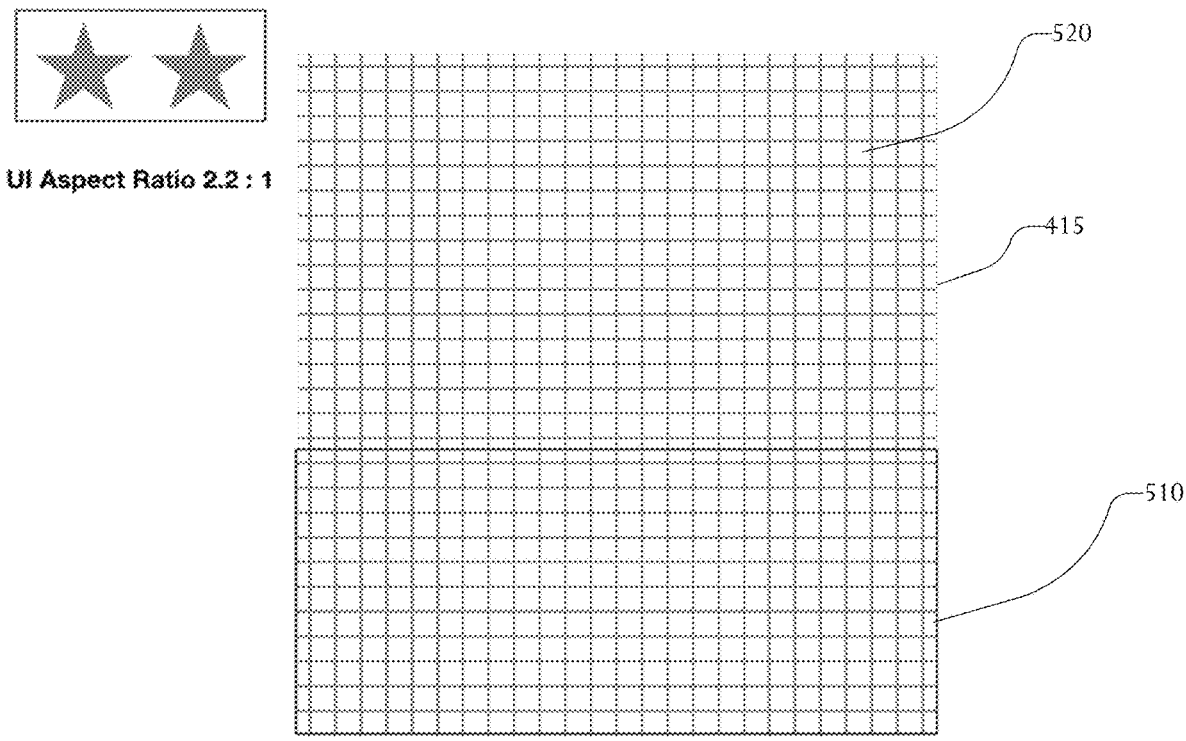
FIG. 7 illustrates another example of a formed active area according to embodiments of the present disclosure.

FIG. 7 illustrates another example of a formed active area 510 according to embodiments of the present disclosure. The embodiment of the formed active area 510 shown in FIG. 7 is for illustration only. Other embodiments could be used without departing from the scope of the present disclosure.

In the example shown in FIG. 7, selecting a menu in the GUI having a rectangular shape with a landscape orientation and an aspect ratio of 2.2:1 will cause the processor 206 to form an active area 510 on the touch surface 415 with a corresponding aspect ratio of 2.2:1. In the example shown in FIG. 7, the active area 510 maximizes the size of the active area 510 having an aspect ratio of 2.2:1 while aligning the active area 510 with the bottom edge of the touch surface 415 in order to facilitate easy reach by the user's finger, which originates from closer to the bottom edge. In certain embodiments, the formed active area 510 is located about the center of the touch surface 415. In another embodiment, the active area 510 is formed at a location determined by engineering factors, such as whether the user is left or right-handed, device orientation and the like.

Figure 8:
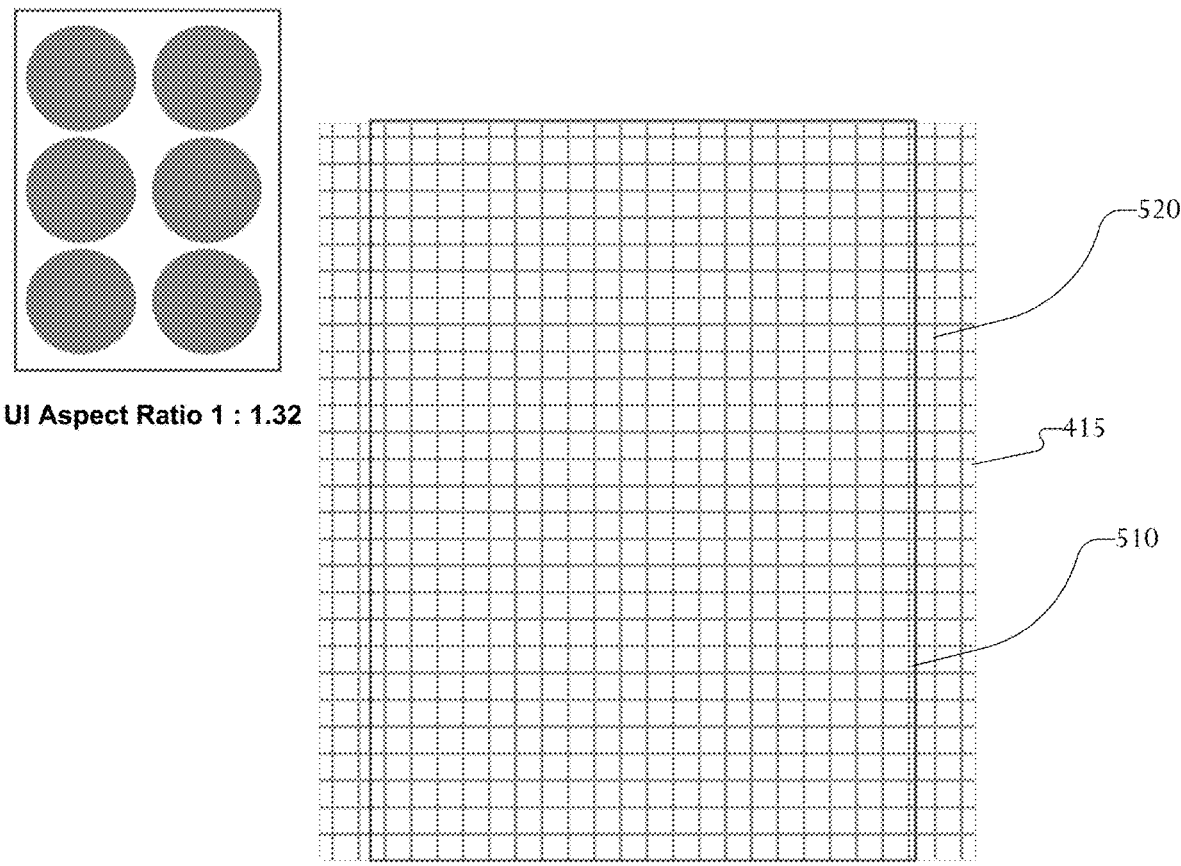
FIG. 8 illustrates another example of a formed active area according to embodiments of the present disclosure.

FIG. 8 illustrates another example of a formed active area 510 according to embodiments of the present disclosure. The embodiment of the formed active area 510 shown in FIG. 8 is for illustration only. Other embodiments could be used without departing from the scope of the present disclosure.

In the example shown in FIG. 8, selecting a menu in the GUI having a rectangular shape with a portrait orientation and an aspect ratio of 1:1.32 will cause the processor 206 to form an active area 510 on the touch surface 415 with a corresponding aspect ratio of 1:1.32. In the example shown in FIG. 8 the active area 510 maximizes the size of the active area 510 having an aspect ratio of 1:1.32 about the center of the touch surface 415, such that the bottom of the active area 510 abuts the bottom edge of the touch surface 415.

Figure 9:
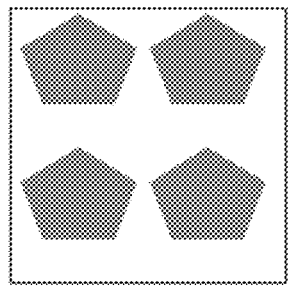
FIG. 9 illustrates another example of a formed active area according to embodiments of the present disclosure.
Figure 9:
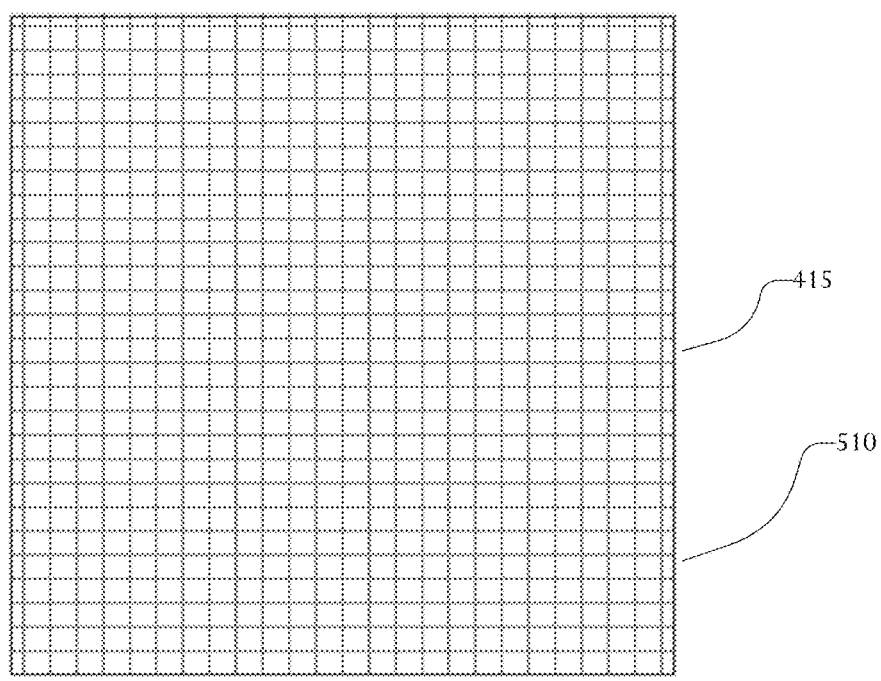

FIG. 9 illustrates another example of a formed active area 510 according to embodiments of the present disclosure. The embodiment of the formed active area 510 shown in FIG. 9 is for illustration. Other embodiments could be used without departing from the scope of the present disclosure.

In the example shown in FIG. 9, selecting a menu in the GUI having an aspect ratio of 1:1.1 will cause the processor 206 to form a corresponding active area 510 on the touch surface 415 with a corresponding aspect ratio of 1:1.1. In the example shown in FIG. 9, the aspect ratio of the touch surface 415 is also 1:1.1 and the active area 510 will therefore correspond entirely to the touch surface 415. Therefore, the entirety of the touch surface 415 of the hover touch sensor 210 will correspond to the active area 510 and there will be no inactive region 510.

In some embodiments the hover touch controller device also includes an inertial Measurement Unit (IMU). The IMU is an electronic device configured to provide measurement information related to orientation (pitch, yaw, roll) using one or more accelerometer(s) and gyroscope(s). The IMU measurement information can be used to calculate attitude, angular rates, linear velocity, and position relative to a global reference. For example, the IMU is able to provide tracking information with respect to an absolute position (x, y, z) and orientation (pitch, yaw, roll) to the processor 206. In certain embodiments, the IMU tracking information allows the orientation of the hover touch controller device 202 to be used as an interactive pointer. While the IMU provides one way of obtaining 3 Degrees Of Freedom (DOF) pointing information, it is not the only way to do so. Other 3D tracking technologies such as magnetic, ultrasound, etc. can also be used to obtain this capability. Further, any technology that provides both orientation information as part of their offering, such as 6 DOF trackers, can be modified to work in this manner.

Figure 10:
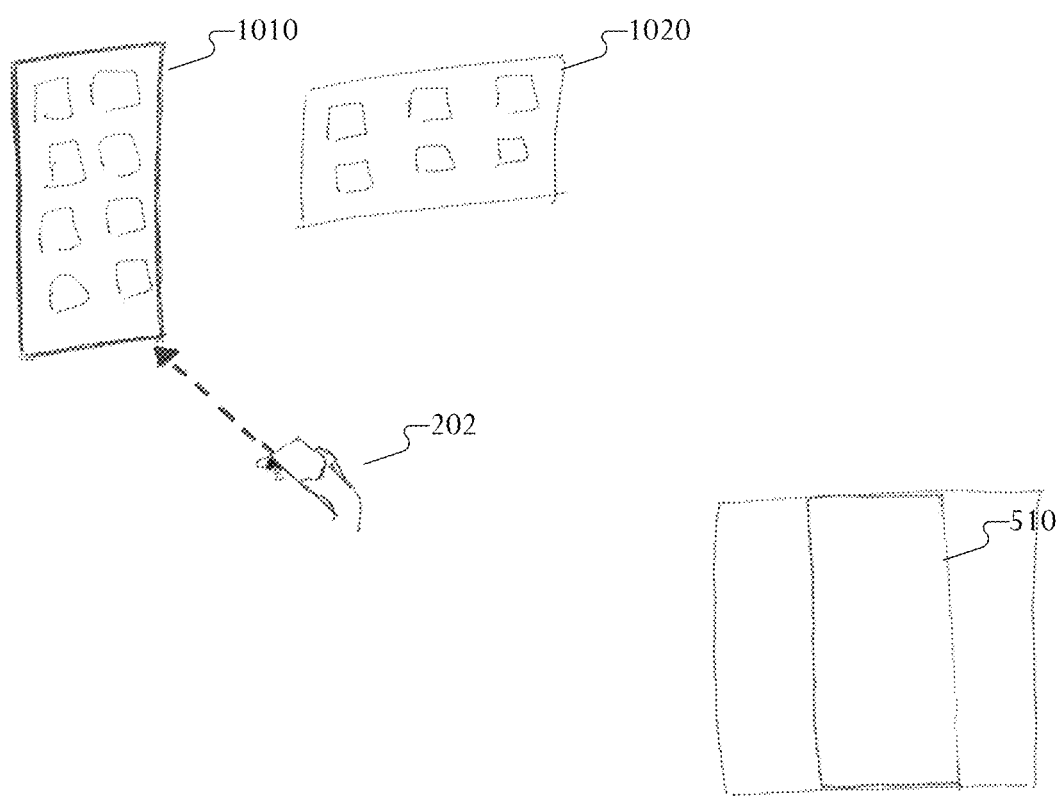
FIG. 10 illustrates another example of determining an aspect ratio for the active area according to embodiments of the present disclosure.

FIG. 10 illustrates another example of determining an aspect ratio for the active area. 510 according to embodiments of the present disclosure. The embodiment of determining an aspect ratio for the active area 510 shown in FIG. 10 is for illustration only. Other embodiments could be used without departing from the scope of the present disclosure.

In the example shown in FIG. 10, the processor 206 is configured to determine the aspect ratio corresponding to a selected menu based on the orientation of the hover touch controller device 202. For example, the aspect ratio of the interactive display may change with a menu selection within the GUI design. As illustrated in FIG. 10, menu 1010 has a portrait orientated aspect ratio and menu 1020 has a landscape orientated aspect ratio. By changing the orientation of the hover touch controller device 202, the user can use the hover touch controller device 202 as in interactive pointer to select either menu 1010 or menu 1020. In certain embodiments, the selection is confirmed by activating either a hardware button or a software button on the hover touch controller device 202. In response to the menu selection the processor 206 is able to reform the active area 510 of touch surface 415 to match the aspect ratio of the selected menu. For example, if the user uses the orientation of the hover touch controller device 202 to select the portrait menu 1010 and confirms the selection by activating a button the aspect ratio of the active area 510 will reform to match the portrait menu 1010 aspect ratio if it is different. Alternatively, or additionally, if the user uses the orientation of the hover touch controller to select the landscape menu 1020 the aspect ratio of the active area 510 will reform to match the landscape aspect ratio.

In some embodiments, the location of the active area 510 is determined by ergonomic factors, such as efficiency and comfort. For example, the portions of the touch surface 415 that a user is able to comfortably reach is dependent on whether the user is right or left-handed and the size of their hand. For this reason, a user can find it either uncomfortable or impossible to reach portions of the active area 510. Therefore, for ergonomic reasons a better method of positioning the active area 510 within the touch surface 415, other than simply positioning the active area 510 at either a centrally mapped area 510 or adjacent to the bottom edge, in the case of a landscape MAR for example, is need.

Figure 11:
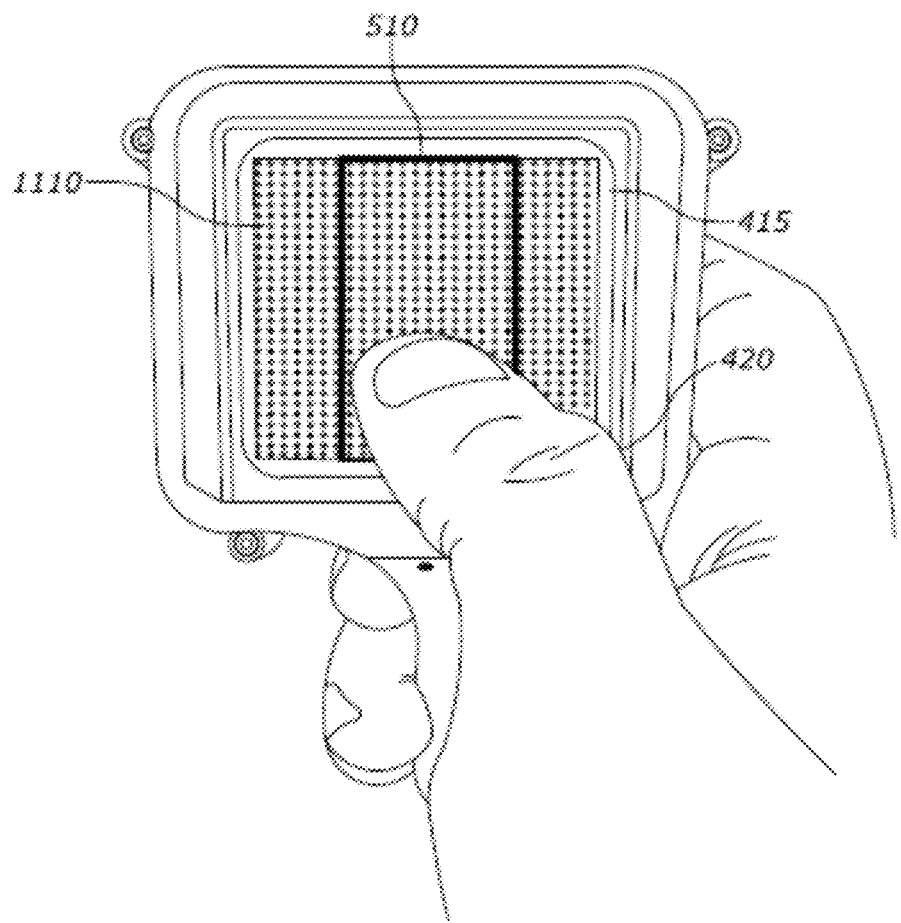
FIG. 11 illustrates an example of a reach pattern according to embodiments of the present disclosure.

FIG. 11 illustrates an example of a reach pattern according to embodiments of the present disclosure. The embodiment of the reach pattern shown in FIG. 11 is for illustration only. Other embodiments could be used without departing from the scope of the present disclosure.

FIG. 11 illustrates a user's reaching pattern for a user using the thumb of his right thumb 420 as the interactive input device when the active area 510 located at the center of the touch surface 415. The user may find it uncomfortable or impossible to reach portion 1110 of the active area 510 with the active region 510 located at the center of the touch surface 415.

Figure 12:
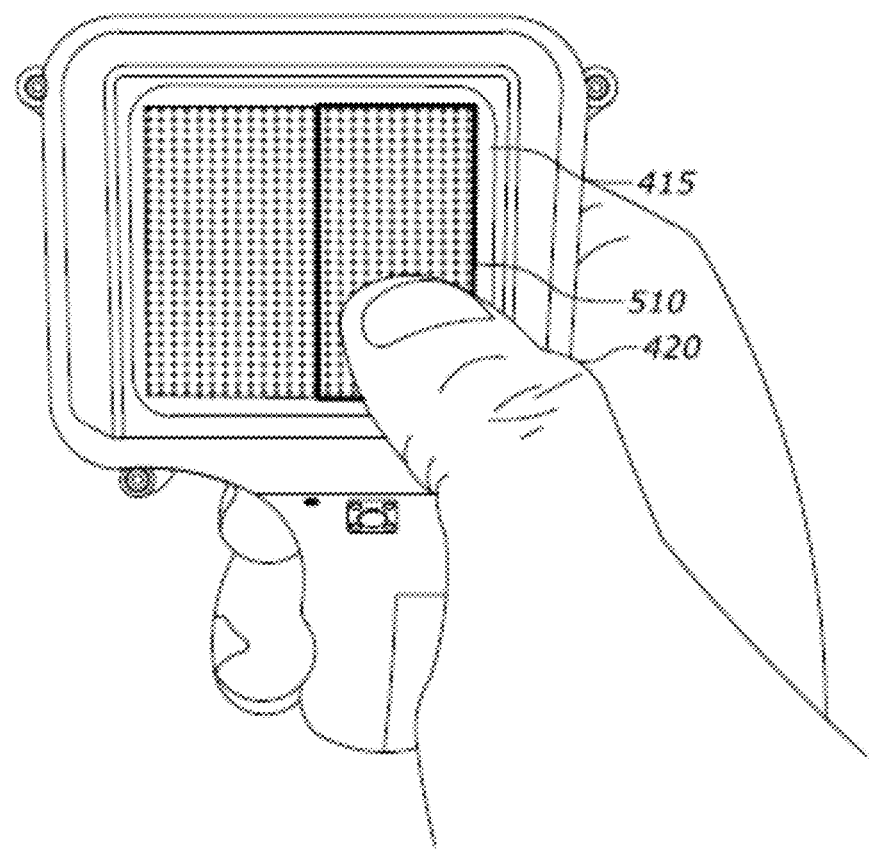
FIG. 12 illustrates another example of a reach pattern when the active area 510 is mapped to the right side of the touch surface according to embodiments of the present disclosure.

FIG. 12 illustrates another example of a reach pattern when the active area 510 is mapped to the right side of the touch surface 415 according to embodiments of the present disclosure. The embodiment of the reach pattern shown in FIG. 12 is for illustration only. Other embodiments could be used without departing from the scope of the present disclosure.

FIG. 12 illustrates the corresponding reaching pattern for the user when the active area 510 is located at the right side of the touch surface 415. As illustrated in FIGS. 11 and 12, locating the active area 510 on the right side of the touch surface 415 would be more comfortable for a user who is using his right thumb 420 as an input device. In certain embodiments, the location of the active area 510 is based on reachability and is static. However, there are other ergonomic factors that do not make the ridged placement of the active area 510 the optimum solution to the problem of reachability. For example, the user's perception of where the active area 510 is located on the touch surface 415 may change over time.

In some embodiments, the processor 206 is able to employ a mapping algorithm to dynamically determine the optimum position to place the active area 510 within the touch surface 415. In certain embodiments, the algorithm is configured to place the maximized area of the active area 510 at a location based on the HOVER_ENTER state as determined by the processor 206. For example, the processor 206 is able to determine the hover entry point from the three-dimensional (x, y, z) position information, thus an (x, y, 0) position relative to the two-dimensional surface of the touch surface 415 that corresponds to the location of the interactive device 420 just as it entered the touch surface 415. The processor 206 is able to further relocate the active area 510 within the touch surface 415 based on the determined hover entry point, such that an edge of the active area 510 is adjacent to the hover entry point. For example, when the processor 206 detects the user's thumb entering the right side of the touch surface 415 in a hover interaction, a HOVER_ENTER, the active area 510 is also placed on the right-hand side of the touch screen. Alternatively, the active area 510 is shifted to the right-hand side of the touch screen if previously located in a different position. The active area 510 remains on the right-hand side of the touch surface 415 until the processor 206 detects the user's thumb leaving the touch surface 415 in a hover interaction, a HOVER_EXIT. For example, if a HOVER_ENTER is detected at the bottom center of the touch surface 415 then the active area 510 shifts to align with the bottom center of the touch surface 415 and remains there until a HOVER_EXIT is detected. In this respect, the active area 510 slides to the most appropriate location, within the confines of the touch surface 415, based on where the user's thumb enters the sensed hover region of the hover touch controller device 202.

Figure 13:
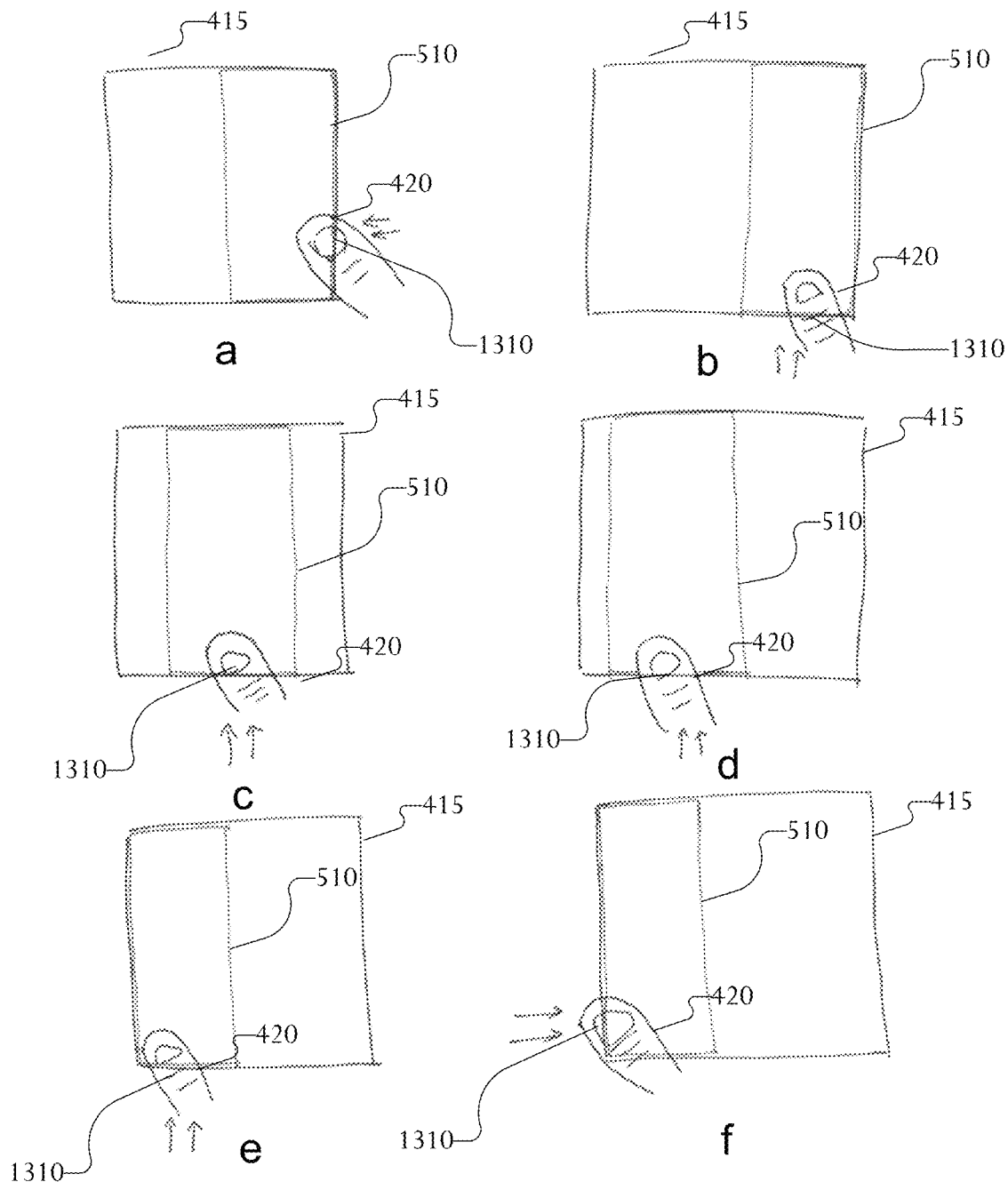
FIG. 13 illustrates examples of active regions having a portrait orientation according to embodiments of this disclosure.

FIG. 13 illustrates examples of active areas 510 having a portrait orientation according to embodiments of the present disclosure. The embodiments of active areas shown in FIG. 13 are for illustration only. Other embodiments could be used without departing from the scope of the present disclosure.

In the example shown in FIG. 13 the active area 510 has a rectangular aspect ratio with a portrait orientation. In response to the processor 206 detecting a HOVER_ENTER the active area 510 adapts to different locations within the confines of the touch surface 415. As illustrated, the active area 510 is configured to align itself, within the constraints of the touch surface 415, by centralizing the active area 510 about the center of the HOVER_ENTER point unless being prevented from doing so. For example, as shown in the examples of FIGS. 13b, 13c, and 13d, the bottom center of the active area 510 is aligned about the center of HOVER_ENTER point 1310. In contrast, to the examples shown in FIGS. 13b, 13c, and 13d, if the location of the HOVER_ENTER prevents this from occurring then active area 510 will be aligned in a best fit method. For example, as shown in the examples of FIGS. 13a, 13b, 13e, and 13f, the location of the HOVER_ENTER point 1310, is such that an edge of the sliding active area 510 abuts the perimeter of the touch screen 415 prior to the active area 510 being fully aligned. That is, if he HOVER_ENTER position 1310 is such that it is not possible for the active area 510 to center itself about the HOVER_ENTER position 1310, the active area 510 does a best fit by abutting itself to the confining edge of the touch surface 415.

Figure 14:
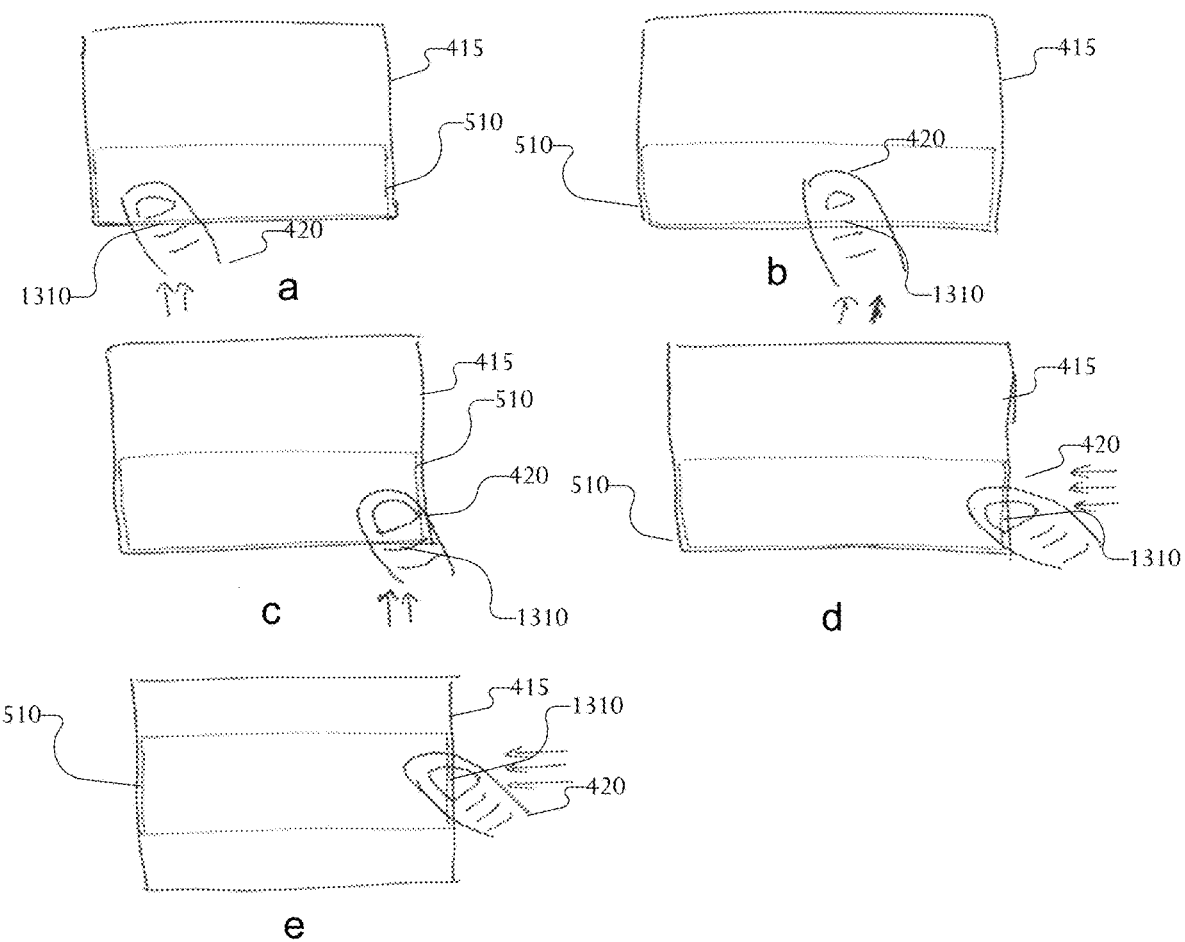
FIG. 14 illustrates examples of active regions having a landscape orientation according to embodiments of this disclosure.

FIG. 14 illustrates examples of active regions having a landscape orientation according to embodiments of the present disclosure. The embodiments of active regions shown in FIG. 14 are for illustration only. Other embodiments could be used without departing from the scope of the present disclosure.

In the example shown in FIG. 14, the active area 510 has a rectangular aspect ratio with a landscape orientation. In response to the processor 206 detecting a HOVER_ENTER, the active area 510 slides to different locations within the confines of touch surface 415. As illustrated, the active area 510 aligns itself, within the confines of the constraints of the touch surface 415, by centralizing the active area 510 about the center of the HOVER_ENTER point 1310, unless being prevented from doing so. For example, as shown in the example of FIG. 14e, the center of the right-hand side active area 510 is aligned about the center of the HOVER_ENTER point 1310. In contrast, to the example of FIG. 14e, if the location of the HOVER_ENTER point 1310 prevents this from occurring, the active area 510 will be aligned in a best fit method. For example, as shown in the examples of FIGS. 14a, 14b, 14c, and 14d, the location of the HOVER_ENTER point 1310, is such that an edge of the sliding active area 510 abuts the perimeter of the touch screen prior to the active area 510 being fully aligned. That is, if he HOVER_ENTER point 1310 position is such that it is not possible for the active area 510 to center itself about the HOVER_ENTER point 1310 position, the active area 510 does a best fit by abutting itself to the confining edge of the touch surface 415.

Figure 15:
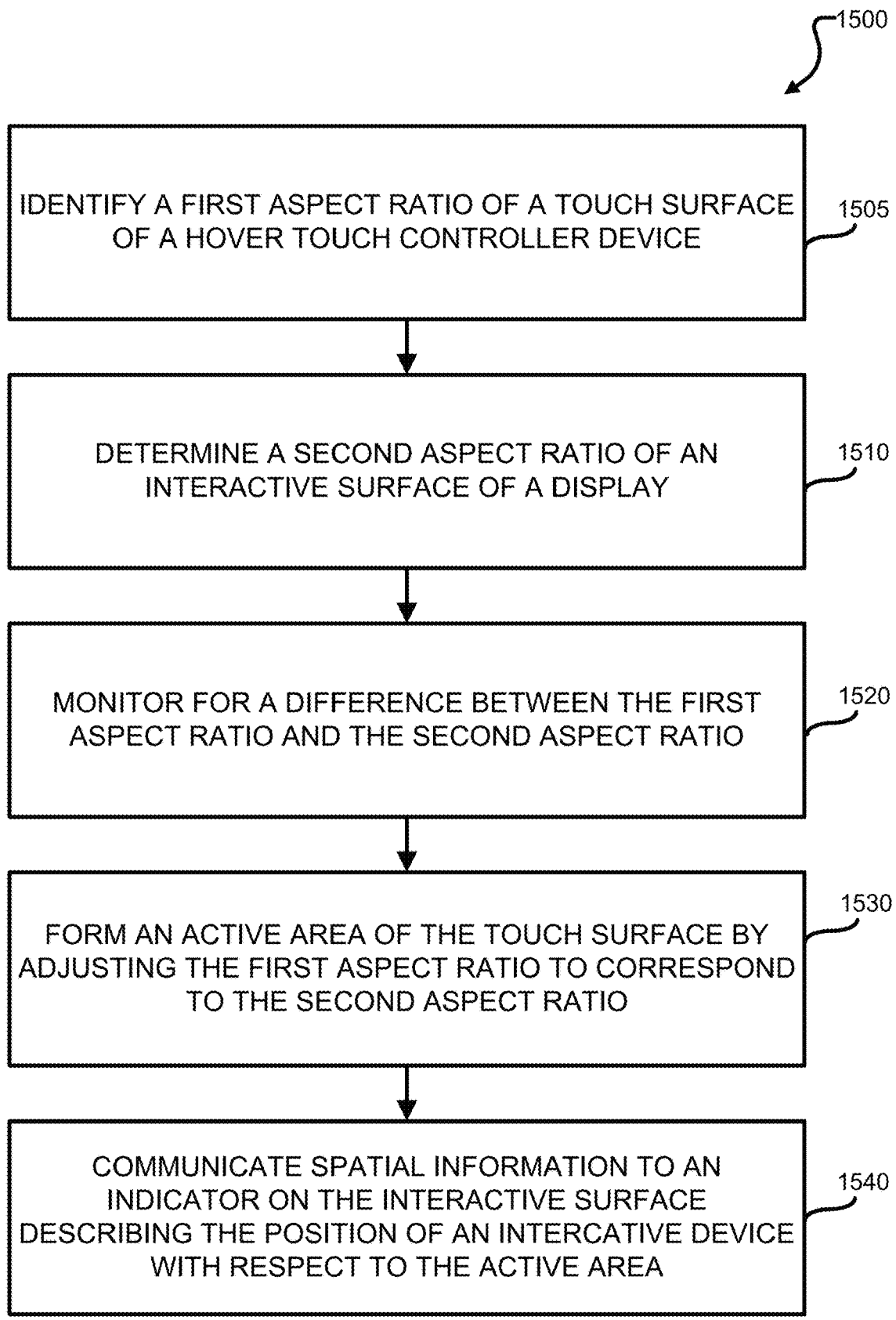
FIG. 15 illustrates operations of a process for correcting for issues associated with supporting a variety of Graphical User Interface (GUI) designs when using a hover touch controller device according to embodiments of the present disclosure as may be performed by a processor.

FIG. 15 illustrates a process 1500 for correcting for supporting a variety of Graphical User Interface (GUI) designs when using a hover touch controller device 202 according to embodiments of the present disclosure as may be performed by a processor. While the flow chart depicts a series of sequential blocks, unless explicitly stated, no inference should be drawn from that sequence regarding specific order of performance, performance of blocks or portions thereof serially rather than concurrently or in an overlapping manner, or performance of the blocks depicted exclusively without the occurrence of intervening or intermediate blocks. The process depicted in the example is implemented by a processor 206 in, for example, a hover touch controller device 202.

In block 1505, the processor identifies a first aspect ratio of a touch surface 415 of a hover touch controller device 202. In block 1510 the processor 206 determines a second aspect ratio of an interactive surface of a display. In some embodiments determining the second aspect ratio is responsive to one or more of selecting a menu within a graphical user interface, changing an orientation of the display or an inertial measurement unit, transitioning of the indicator from a first interactive display surface to a second interactive display surface, and/or determining whether the indicator interaction with the interactive display surface is a relative interaction or an absolute interaction.

Subsequently, in block 1520 the processor 206 monitors for a difference between the second aspect ratio and the first aspect ratio.

In some embodiments, in block 1520, the processor 206 further receives spatial information for the interactive device 420 including two-dimensional position information from a touch sensor 210 describing the interactive device 420 touching a contact point on the touch surface 415 and three-dimensional position information from a proximity sensor describing the interactive device 420 hovering within a maximum depth of a hover point projected on the touch surface 415. In some embodiments, in block 1520, the processor 206 further determines a two-dimensional hover entry point relative to the two-dimensional surface of the touch surface 415 from the received three-dimensional position information corresponding to where the projected hover point initially enters the touch surface 415.

Next, in response to identifying that the second aspect ratio is different from the first aspect ratio, the processor 206 in block 1530 forms an active area 510 of the touch surface 415 by adjusting the first aspect ratio to correspond to the second aspect ratio. In some embodiments, forming the active area 510 includes configuring a first portion of the touch surface 415 to be an active area 510 and configuring a second portion of the touch surface 415 to be an inactive area 520. In some embodiments, forming the active area 510 includes maximizing the area of the active area 510 about a center of the touch surface 415. In some embodiments, the processor 206 in block 1530 forms the active area 510 of the touch surface 415 in response to detecting a change in the interactive surface. In some embodiments, the processor 206 in block 1530 further forms the active area 510 within the touch surface 415 based on the hover entry point, such that an edge of the active area 510 is adjacent to the hover entry point. In some embodiments, the processor 206 in block 1530 further relocates the active area 510 within the touch surface 415 based on successive hover entry points.

Subsequently, in block 1540 the processor 206 communicates spatial information to an indicator on the interactive surface describing the position of the interactive device 420 with respect to the active area 510.

Although the present disclosure has been described in conjunction with specific embodiments, it will be understood that it is not it is not the intention to limit the invention to the described embodiments. On the contrary, it is intended to cover alternatives, modifications, and equivalents as may be suggested to one skilled in the art as fall within the scope of the appended claims. The present invention may be practiced without some or all of these specific details. In addition, well known features may not have been described in detail to avoid unnecessarily obscuring the invention.

In accordance with the present invention, the components, process steps, and/or data structures may be implemented using various types of operating systems, programming languages, computing platforms, computer programs, and/or computing devices. In addition, those of ordinary skill in the art will recognize that devices such as hardwired devices, field programmable gate arrays (FPGAs), application specific integrated circuits (ASICs), or the like, may also be used without departing from the scope and spirit of the inventive concepts disclosed herein. The present invention may also be tangibly embodied as a set of computer instructions stored on a computer readable medium, such as a memory device.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A hover touch controller device for interacting with an interactive device, the hover touch controller device comprising:
   a touch surface having a first aspect ratio; and
   a processor coupled to the touch surface, configured to:
      form an active area of the touch surface and an inactive area of the touch surface, the active area having a changeable aspect ratio;
      retrieve a second aspect ratio of an interactive surface of a display device, wherein the second aspect ratio is different from the first aspect ratio,
      change the active area of the touch surface to correspond to the second aspect ratio, and
      communicate spatial information to an indicator on the interactive surface of the display device describing the position of the interactive device with respect to the active area.

2. The hover touch controller device of claim 1, wherein the processor is further configured to form the active area of the touch surface based on a change of the interactive surface.

3. The hover touch controller device of claim 1, further comprising:
   a touch sensor configured to provide two-dimensional position information associated with the interactive device touching a contact point on the touch surface, and
   a proximity sensor configured to provide three-dimensional position information associated with the interactive device hovering within a maximum depth of a hover point projected on the touch surface.

4. The hover touch controller device of claim 3, wherein the processor is further configured to:
   determine a hover entry point based on the position where a hover point initially enters the touch surface; and
   reform the active area within the touch surface based on the hover entry point, such that an edge of the active area is adjacent to the hover entry point;
   wherein the active area is adapted within the touch surface based on successive hover entry points.

5. The hover touch controller device of claim 1, wherein a first portion of the touch surface is configured to be the active area and a second portion of the touch surface is configured to be an inactive area.

6. The hover touch controller device of claim 1, wherein the processor is further configured to maximize the area of the active area about a center of the touch surface.

7. The hover touch controller device of claim 1, wherein the processor is further configured to determine the second aspect ratio based on one or more of:
   a menu selection within a graphical user interface;
   an orientation of the display device or an inertial measurement unit;
   the indicator transitioning from a first interactive display surface to a second interactive display surface; or
   a determination of the interaction of the indicator with the interactive display surface as one of the following: a relative interaction or an absolute interaction.

8. A method for interacting with an interactive device, the method comprising:
   identifying, by a processor in a touch surface, a first aspect ratio of the touch surface;
   forming an active area of the touch surface and an inactive area of the touch surface, the active area having a changeable aspect ratio
   determining, by the processor in the touch surface, a second aspect ratio of an interactive surface of a display device;
   monitoring, by the processor in the touch surface, for a difference between the second aspect ratio and the first aspect ratio; and
   responsive to identifying the second aspect ratio being different from the first aspect ratio:
      changing, by the processor in the touch surface, the active area of the touch surface to correspond to the second aspect ratio, and
      communicating spatial information to an indicator on the interactive surface describing the position of the interactive device with respect to the active area.

9. The method for interacting with an interactive device of claim 8, wherein forming the active area of the touch surface is in response to detecting a change on the interactive surface.

10. The method for interacting with an interactive device of claim 8, further comprising:
   receiving two-dimensional position information from a touch sensor describing the interactive device touching a contact point on the touch surface, and
   receiving three-dimensional position information from a proximity sensor describing the interactive device hovering within a maximum depth of a hover point projected on the touch surface.

11. The method for interacting with an interactive device of claim 10, further comprising:
   determining a hover entry point from the received three-dimensional position information corresponding to where a hover point initially enters the touch surface; and
   forming the active area within the touch surface based on the hover entry point, such that an edge of the active area is adjacent to the hover entry point; and
   adapting the active area within the touch surface based on successive hover entry points.

12. The method for interacting with an interactive device of claim 8, wherein forming the active area includes configuring a first portion of the touch surface to be the active area and configuring a second portion of the touch surface to be an inactive area.

13. The method for interacting with an interactive device of claim 8, wherein forming the active area includes maximizing the area of the active area about a center of the touch surface.

14. The method for interacting with an interactive device of claim 8, wherein determining the second aspect ratio is responsive to one or more of:
   selecting a menu within a graphical user interface;
   changing an orientation of the display or an inertial measurement unit;
   transitioning of the indicator from a first interactive display surface to a second interactive display surface; or
   determining the interaction of the indicator with the interactive display surface as one of the following: a relative interaction or an absolute interaction.

15. A non-transitory computer-readable storage medium having a plurality of instructions stored thereon which, when executed by a processor in a touch surface, cause the processor to perform operations comprising:
   identifying a first aspect ratio of the touch surface;
   forming an active area of the touch surface and an inactive area of the touch surface, the active area having a changeable aspect ratio determining a second aspect ratio of an interactive surface of a display device;
   monitoring for a difference between the second aspect ratio and the first aspect ratio; and
   responsive to identifying the second aspect ratio being different from the first aspect ratio:
      changing the active area of the touch surface to correspond to the second aspect ratio, and
      communicating spatial information to an indicator on the interactive surface describing the position of an interactive device with respect to the active area.

16. The non-transitory computer readable medium of claim 15, wherein forming the active area of the touch surface is in response to detecting a change on the interactive surface.

17. The non-transitory computer readable medium of claim 15, further comprising:
   receiving two-dimensional position information from a touch sensor describing the interactive device touching a contact point on the touch surface, and
   receiving three-dimensional position information from a proximity sensor describing the interactive device hovering within a maximum depth of a hover point projected on the touch surface.

18. The non-transitory computer readable medium of claim 17, further comprising:
   determining a hover entry point from the received three-dimensional position information corresponding to where a hover point initially enters the touch surface; and
   forming the active area within the touch surface based on the hover entry point, such that an edge of the active area is adjacent to the hover entry point; and
   adapting the active area within the touch surface based on successive hover entry points.

19. The non-transitory computer readable medium of claim 15, wherein forming the active area includes configuring a first portion of the touch surface to be the active area and configuring a second portion of the touch surface to be an inactive area.

20. The non-transitory computer readable medium of claim 15, wherein forming the active area includes maximizing the area of the active area about a center of the touch surface.

21. The non-transitory computer readable medium of claim 15, wherein determining the second aspect ratio is responsive to one or more of:
   selecting a menu within a graphical user interface;
   changing an orientation of the display or an inertial measurement unit;
   transitioning of the indicator from a first interactive display surface to a second interactive display surface;
   determining the interaction of the indicator with the interactive display surface as one of the following: a relative interaction or an absolute interaction.

* * * * *